US011232196B2

(12) United States Patent
Vineyard et al.

(10) Patent No.: US 11,232,196 B2
(45) Date of Patent: Jan. 25, 2022

(54) TRACKING EVENTS OF INTEREST TO MITIGATE ATTACKS

(71) Applicant: Arm Limited, Cambridge (GB)

(72) Inventors: Carl Wayne Vineyard, Leander, TX (US); Christopher Neal Hinds, Austin, TX (US); Subbayya Chowdary Yanamadala, Dallas, TX (US); Asaf Shen, Irvine, CA (US)

(73) Assignee: ARM LIMITED, Cambridge (GB)

( * ) Notice: Subject to any disclaimer, the term of this patent is extended or adjusted under 35 U.S.C. 154(b) by 126 days.

(21) Appl. No.: 16/409,205

(22) Filed: May 10, 2019

(65) Prior Publication Data

US 2020/0012783 A1    Jan. 9, 2020

Related U.S. Application Data

(63) Continuation-in-part of application No. 16/030,459, filed on Jul. 9, 2018.

(51) Int. Cl.
*G06F 21/55* (2013.01)
*G06F 21/56* (2013.01)

(52) U.S. Cl.
CPC .......... *G06F 21/552* (2013.01); *G06F 21/566* (2013.01); *G06F 2221/034* (2013.01)

(58) Field of Classification Search
CPC ..... G06F 21/552; G06F 21/566; G06F 21/034
(Continued)

(56) References Cited

U.S. PATENT DOCUMENTS 3,887,911 A * 6/1975 Bell ............... H03K 17/603
341/138
3,989,034 A    11/1976 Hojaiban
(Continued)

FOREIGN PATENT DOCUMENTS

EP    2009864 A1    12/2008
EP    3040901 A1    7/2016

OTHER PUBLICATIONS

"International Search Report and Written Opinion Issued in International Patent Application No. PCT/GB2019/051872", dated Aug. 6, 2019, 13 Pages.
(Continued)

*Primary Examiner* — Dant B Shaifer Harriman
(74) *Attorney, Agent, or Firm* — Talem IP Law, LLP

(57) ABSTRACT

A computing device can include a comparator coupled to an I/O pin of the computing device; a storage unit coupled to the comparator; and a counter coupled to receive an output of the comparator, an output of the counter being coupled to a computation engine to provide a limit-exceeded signal to the computation engine, wherein the counter comprises a volatile counter and a nonvolatile storage, wherein the nonvolatile storage stores a bit for each top volatile count number of events identified by the volatile counter. The computing device can further include a backup power source coupled to the volatile counter; and readout circuitry and control logic coupled to the volatile counter and to the nonvolatile storage, the readout circuitry and control logic being configured to control operations of the volatile counter during an error event and determine a total number of events. The computing device can be a smart card.

13 Claims, 14 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 4,066,964 | A | * | 1/1978 | Costanza ................. H04B 7/24 340/7.42 |
| 4,187,399 | A | | 2/1980 | Maxfield et al. |
| 4,204,256 | A | * | 5/1980 | Klotzner ............... F02P 5/1502 701/115 |
| 4,789,925 | A | * | 12/1988 | Lahti ..................... G06F 9/3824 708/441 |
| 4,907,845 | A | | 3/1990 | Wood |
| 5,218,707 | A | | 6/1993 | Little et al. |
| 5,996,081 | A | | 11/1999 | Shim |
| 6,073,236 | A | | 6/2000 | Kusakabe et al. |
| 6,289,455 | B1 | | 9/2001 | Kocher et al. |
| 7,120,220 | B2 | * | 10/2006 | Du ....................... H03K 21/403 377/15 |
| 7,421,552 | B2 | | 9/2008 | Long |
| 8,031,521 | B1 | * | 10/2011 | Yang ..................... G11C 16/06 365/185.02 |
| 8,559,576 | B2 | | 10/2013 | Ono et al. |
| 8,688,862 | B1 | * | 4/2014 | Alley ................. G01R 31/3177 710/1 |
| 8,762,656 | B2 | | 6/2014 | Confalonier et al. |
| 9,454,424 | B2 | * | 9/2016 | Von Wendorff .... G06F 11/3055 |
| 2006/0140331 | A1 | * | 6/2006 | Du ....................... H03K 21/403 377/101 |
| 2010/0332851 | A1 | | 12/2010 | Priel et al. |
| 2011/0085379 | A1 | * | 4/2011 | Kim ................... G11C 16/0483 365/185.03 |
| 2011/0145595 | A1 | * | 6/2011 | Kim ........................ G06F 21/72 713/189 |
| 2012/0284533 | A1 | * | 11/2012 | Assche .................. H04L 9/002 713/192 |
| 2016/0062810 | A1 | * | 3/2016 | Von Wendorff .... G06F 11/0721 714/38.1 |
| 2016/0117219 | A1 | | 4/2016 | Halbert et al. |
| 2016/0371161 | A1 | | 12/2016 | Louie et al. |
| 2017/0060681 | A1 | * | 3/2017 | Halbert ............... G06F 11/1068 |
| 2017/0075812 | A1 | | 3/2017 | Wu et al. |
| 2017/0177262 | A1 | | 6/2017 | Sharma et al. |
| 2018/0175864 | A1 | | 6/2018 | Walrant et al. |
| 2019/0042739 | A1 | * | 2/2019 | Browne ................ G06F 21/554 |

OTHER PUBLICATIONS

Office Action Issued in U.S. Appl. No. 16/030,459, dated Sep. 11, 2020, 26 Pages.
Smart Card Alliance, "What Makes a Smart Card Secure?", A Smart Card Alliance Contactless and Mobile Payments Council White Paper, https://www.securetechalliance.org/publications-smart-card-security/, Published in Oct. 2008, 37 pages.
Non-Final Office Action Issued in U.S. Appl. No. 16/409,314, dated Jan. 29, 2021. 25 Pages.
Final Office Action Issued in U.S. Appl. No. 16/030,459, dated Feb. 12, 2021, 35 Pages.
Non-Final Office Action issued in U.S. Appl. No. 16/030,459, dated Aug. 3, 2021, 42 pages.
Corrected Notice of Allowability issued in U.S. Appl. No. 16/409,314, dated Oct. 6, 2021, 8 pages.

* cited by examiner

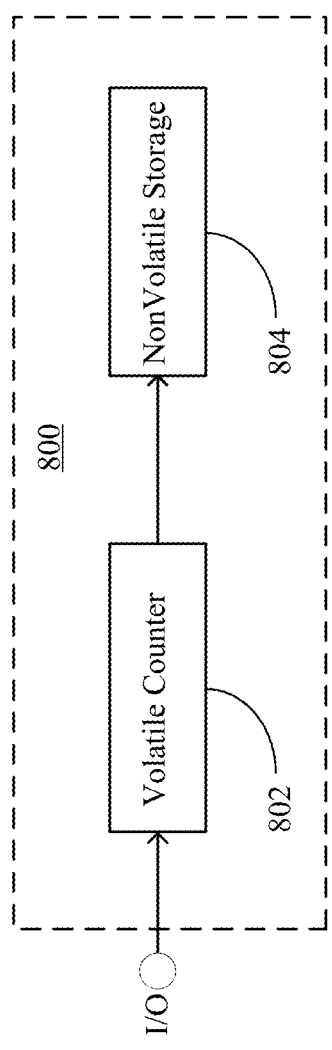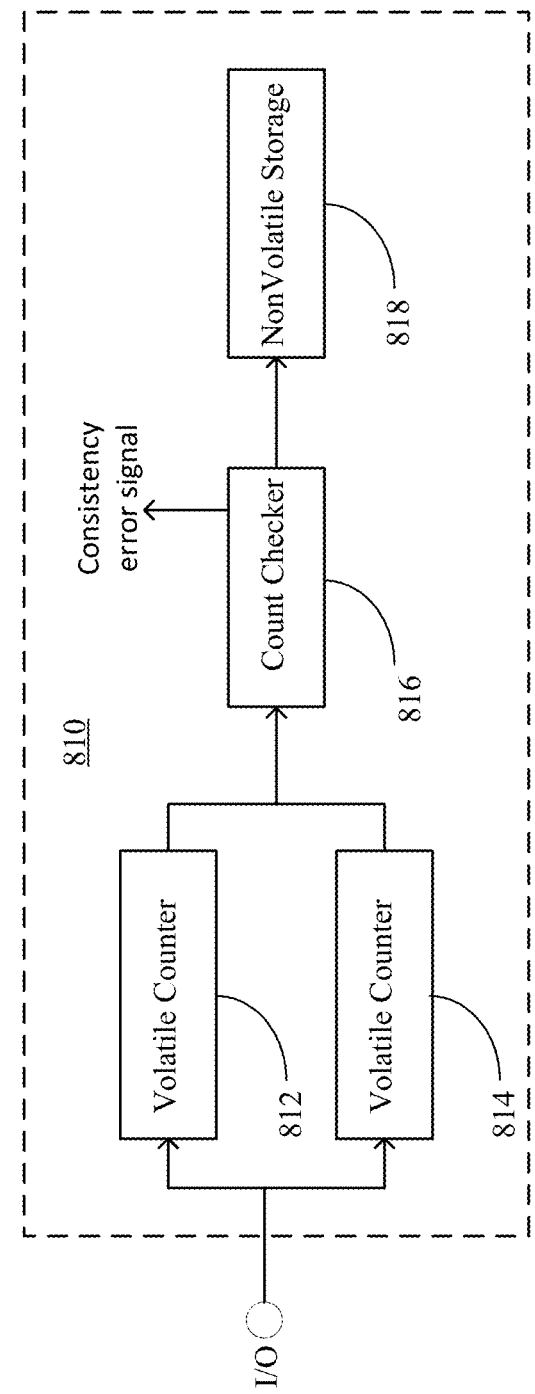

TRACKING EVENTS OF INTEREST TO MITIGATE ATTACKS

CROSS-REFERENCE TO RELATED APPLICATION

This application is a continuation-in-part of U.S. application Ser. No. 16/030,459, filed Jul. 9, 2018.

BACKGROUND

Smart cards are portable, personal security computing devices that can securely carry sensitive information, enable secure transactions, validate an individual's identity within a secure system, and verify that an information requestor is authorized to access the information carried on the card. Smart cards are configured to maintain the integrity of the information stored on the card, as well as make the information available for secure interactions with an overall system.

Computing devices, including smart cards, may be subject to different types of attacks to garner information and/or compromise security of the computing device. These attacks include fault injection and side channel attacks (SCAs). Fault injection attacks generally include attacks based on introducing an error into a system to force certain outputs or characteristics. SCAs generally include attacks based on information gained from the physical implementation of a cryptosystem, including timing information, power consumption, electromagnetic leaks, and sound. Attacks such as fault injection and SCAs involve repetitive activity with respect to applying an input signal in order to capture information from, for example, the power pins or signal lines of the smart card.

Countermeasures against attacks may include detection components and response components. A detection component includes hardware and/or software that determines a possible attack is occurring (e.g., which may be a binary determination of attack conditions being tripped or a determination with probabilities providing confidence values). A response component includes hardware and/or software that performs an action in response to a detection component indicating that the attack is occurring (with or without a certain level of confidence). The response component may be a switch that resets or shuts down the cryptography engine, or even more complex circuitry that changes characteristics of the device, as some examples.

BRIEF SUMMARY

Repetitive attack countermeasures for computing devices and methods and systems for tracking events of interest including those identified to mitigate repetitive attacks are described herein. The described countermeasures are suitable for protecting against side channel attacks as the repetitive behavior of the attack is occurring.

A computing device incorporating repetitive side channel attack (SCA) countermeasures can include a timer circuit and a capacitive delay circuit that notifies of a potential repetitive-based attack by sending an activity-detected signal that can be used, for example, to reset a computation engine or perform another appropriate countermeasure response.

The timer circuit can receive a clock signal and a reset signal of the computing device and outputs a timer-on notification to a computation engine of the computing device and a delay-capture signal to the capacitive delay circuit. The capacitive delay circuit can be configured to output an activity-detected signal in response to the computing device having power or reset applied within a specified amount of time after a prior application of power or reset. In some cases, the activity-detected signal can be output when the computing device is powered for an amount of time that is shorter than would be for a typical operation. The capacitive delay circuit can include a capacitor, an amplifier, and a latch or flip-flop gate. The capacitor can be coupled between power (VDD) and ground (VSS or GND) of the computing device. The amplifier can be coupled to the capacitor to sense the charge on the capacitor and output the signal to the latch or flip-flop gate. The latch or flip-flop gate receives the delay-capture signal from the timer circuit to output an activity-detected signal to the computation engine when both the delay capture signal is output as a clock from the timer circuit is on and the signal from the amplifier has a high enough value.

A computing device incorporating repetitive SCA attack countermeasures can include at least one storage unit that can store an incoming input signal to a computation engine of the computing device, at least one comparator to compare a next incoming input signal with a prior incoming signal stored in the storage unit and indicate a match, and a counter that increments upon the match. When the counter reaches a specified limit, a limit-exceeded signal can be sent to notify of a potential repetitive-based attack and initiate an appropriate countermeasure response.

In some cases, multiple comparators and storage units can be provided so that a sequence of input signals can be analyzed for repetitive signals. One or more counters may be coupled to the multiple comparators.

In some cases, the one or more counters may include reliability measures to maintain the integrity of the count. Techniques for reliably storing count information efficiently in nonvolatile memory when power loss or other manipulation occurs are described herein. The described methods, techniques, and systems for tracking events of interest are suitable for maintaining the integrity of the count of certain events so that, for example, a side channel or fault injection attack can be recognized as the repetitive behavior of the attack is occurring.

A system for tracking events of interest can include at least one storage unit that can store an incoming input signal to a computation engine of the computing device, at least one comparator to compare a next incoming input signal with a prior incoming signal stored in the storage unit and indicate a match, and a counter that increments upon the match. The counter can be a volatile counter; and a non-volatile storage can be coupled to the volatile counter, the nonvolatile storage storing a bit for each top volatile count number of events identified by the volatile counter. The system can further include a backup power source coupled to the volatile counter; and readout circuitry and control logic coupled to the one or more of the at least one volatile counter and to the nonvolatile storage, the readout circuitry and control logic being configured to control operations of the at least one volatile counter during an error event and determine a total number of events. When the counter reaches a specified limit, a limit-exceeded signal can be sent to notify of a potential repetitive-based attack and initiate an appropriate countermeasure response In one scenario, upon receiving the error event, the volatile counter is powered by a backup power source for a predetermined length of time during the error event. In some cases, the predetermined length of time may be the amount of time sufficient to write a single bit to the nonvolatile storage. In another case, the predetermined length of time may be the amount of time sufficient to maintain at least a significant bit of the count for the volatile counter during an error event. In some cases, the backup power source may be a capacitor or other similar device coupled to at least a significant bit position of the volatile counter. The predetermined length of time may vary depending on the intent of the need for the volatile counter to retain power. For example, the predetermined length of time may be one minute, five minutes, ten minutes, or twenty minutes. In any case, the predetermined length of time may be designed to last until a primary power source is expected to return or until the attack ceases.

In some cases, upon receiving an error event, a bit is written to nonvolatile storage regardless of the value in the volatile counter; and the volatile counter may not be powered by the backup power source for the duration of the error event.

In these scenarios, when a request for a total number of events that have occurred is received, readout circuitry and control logic determines the total number of events by reading the number of bits written to the nonvolatile storage, decoding a nonvolatile value by multiplying the number of events written to the nonvolatile storage by the top volatile count, reading a volatile value from the count of the volatile counter and adding the nonvolatile value to the volatile value. The volatile value used in this determination is a current value at a time of the request for the total number of events. The total number of events is then provided to a source of the request.

In another scenario, upon receiving an error event, the volatile counter is powered by a backup power source at least until a snapshot of the count in the volatile counter is stored in the nonvolatile storage. A snapshot may be a representation of the exact number of events counted in the volatile counter.

In this other scenario, when a request for a total number of events that have occurred is received, readout circuitry and control logic determines the total number of events by determining a nonvolatile value by reading the number of bits written to the nonvolatile storage, decoding an initial nonvolatile value by multiplying the number of events written to the nonvolatile storage by the top volatile count, reading the snapshot of the count stored in the nonvolatile storage, and adding the snapshot of the count stored in the nonvolatile storage to the initial nonvolatile value. The readout circuitry and control logic finishes determining the total number of events by reading a volatile value from the count of the volatile counter representing the current value at a time of the request for the total number of events and then adding the nonvolatile value to the volatile value to generate the total number of events. The readout circuitry and control logic completes the method by providing the total number of events to a source of the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8A shows an example implementation of a counting system with a volatile counter and nonvolatile storage.

FIG. 8B shows an example implementation of a counting system with two volatile counters, a count checker, and nonvolatile storage.

DETAILED DESCRIPTION

Repetitive attack countermeasures for computing devices and methods and systems for tracking events of interest and maintaining a count of those events of interest are described herein. The described countermeasures are suitable for protecting against side channel attacks as the repetitive behavior of the attack is occurring. The events of interest can include such repetitive side channel attacks and fault injection attacks as well as other events, such as power loss. An example of a computing device is a cryptography engine, which may be implemented as part of a smart card. Techniques for storing count information efficiently in nonvolatile memory when power loss or other manipulation occurs is also addressed. The described methods, techniques, and systems for tracking events of interest are suitable for maintaining the integrity of the count of certain events so that a side channel or fault injection attack can be recognized as the repetitive behavior of the attacks is occurring.

In one repetitive side channel attack scenario, a smart card is applied with different signals with a reset in between. A smart card (or other computing device subject to such a side channel attack scenario) incorporating repetitive SCA countermeasures can include a timer circuit and a capacitive delay circuit that notifies of a potential repetitive-based attack by sending an activity-detected signal that can be used to initiate an appropriate countermeasure response. For example, the activity-detected signal may be used to reset a cryptography engine of a smart card or perform another appropriate countermeasure response when the smart card is powered for an amount of time that is shorter than what would be for typical operation or in response to the smart card having power or reset applied within a specified amount of time after a prior application of power or reset.

In another repetitive side channel attack scenario, a smart card is applied with the same input signal over and over again. A smart card (or other computing device subject to such a side channel attack scenario) incorporating repetitive SCA countermeasures can include at least one storage unit that can store an incoming input signal, at least one comparator to compare a next incoming input signal with a prior incoming signal stored in the storage unit and indicate a match, and a counter that increments upon the match. When the counter reaches a specified limit, a limit-exceeded signal can be sent to notify of a potential repetitive-based attack and initiate an appropriate countermeasure response.

Figure 1A:
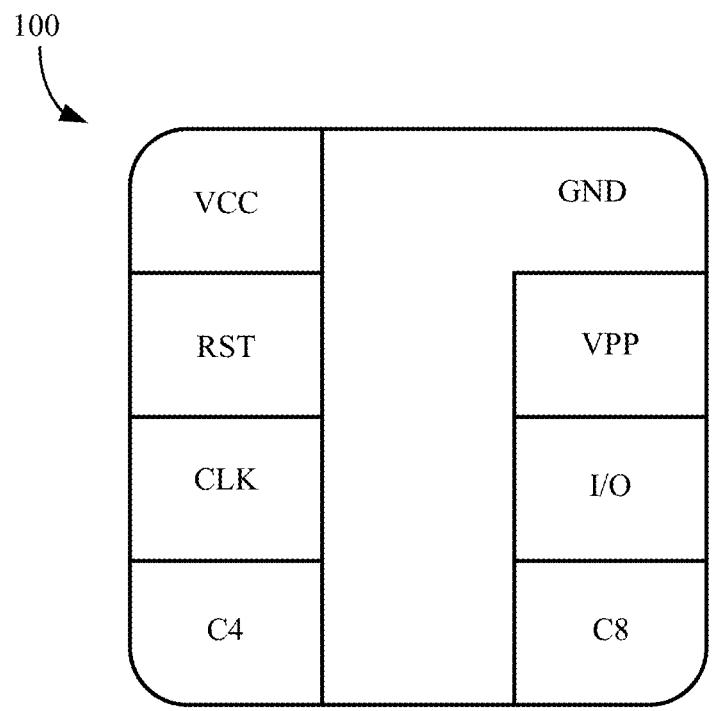
FIG. 1A shows an illustrative smart card pinout for a smart card chip that can include any of the hardware countermeasures described herein.
Figure 1B:
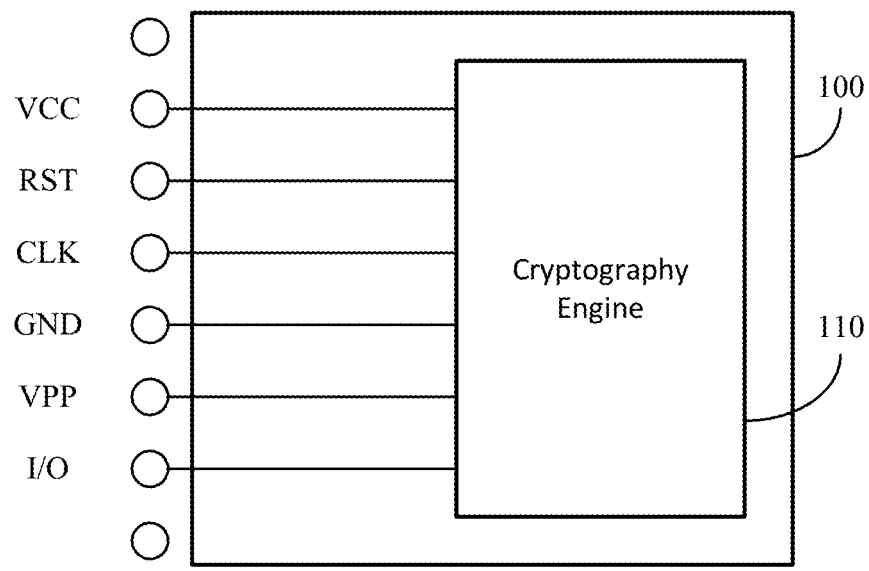
FIG. 1B provides a representational diagram of a smart card.

FIG. 1A shows an illustrative smart card pinout for a smart card chip that can include any of the hardware countermeasures described herein; and FIG. 1B provides a representational diagram of a smart card chip. A smart card chip 100 includes circuitry and packaging. Presently, standard smart card chip packaging provides a 6 pin or 8 pin bus pinout. As shown in FIG. 1A, packaging for a smart card chip 100 can include pads for VCC (power supply input), RST (can be used by itself or in combination with an internal reset control circuit), CLK (clocking or timing signal), GND (ground—a ground or VSS signal), VPP (programming voltage input), and I/O (input or output for serial data to the microcontroller inside the smart card). Two additional connection pads (e.g., C4 and C8) can be included for application specific inputs (or outputs) or future standards. The pads are coupled to the smart card chip circuitry, including a cryptographic engine block 110. Although only a cryptographic engine block 110 is illustrated in FIG. 1B, a smart card chip 100 can include a plurality of different circuit blocks and sub-blocks, including, but not limited to, a processor, memory, analog circuitry, and interface circuitry, in addition to the cryptographic engine block 110. Furthermore, any one or combination of countermeasures described herein can be included as part of smart card chip 100.

The data input signal to the smart card for a transaction (and provided to the cryptography engine 110 via I/O pin) is referred to herein as an information cycle. An information cycle can include, but is not limited to, an input signal formed of digital bits, analog waveforms, or mixed signal data. In many cases, the information cycle uses plain text or cipher text.

During normal operation of smart card chip 100, the smart card in which chip 100 is embedded may be inserted into a contact-based reader or placed in a position for wireless reader connectivity. There is generally an expectation that a reasonable period of time occurs between transactions using the smart card. For example, there is a certain amount of time it takes to ring up a purchase, slide a card into a reader, enter a pin, and complete the transaction; and then go to another store or ring up another purchase at the same store, slide the card into the reader, enter the pin, and complete that other purchase.

In normal use of a smart card, such as during a credit/debit card transaction, the owner of the smart card may initiate a transaction at one store and then initiate another transaction at a different store several minutes later (or longer). There is a reasonable time lapse between each iteration of running the instructions in the process, and the information cycle may be different with each iteration.

In contrast to normal use of a smart card, repetitive side channel attacks typically involve performing an activity repeatedly in a short amount of time. In an attack, the information cycle can be the same every time or different. Typical repetitive attacks can be performed, for example, 1000-10,000 or more times per second. This repetitive information cycle can be observed using an oscilloscope and the fluctuations in voltage or current can be noted either at the power pins or at a point of interest within the smart card using a probing device. This analysis of the smart card can allow an attacker to deduce the secret key based upon the known arithmetic operations within the algorithm and the value of the input text.

A repetitive SCA countermeasure described herein can identify when too many access attempts have been made in a fixed amount of time (even with system resets), indicating abnormal use. Additionally, a repetitive SCA countermeasure described herein can identify when too many attempts have been made using the same information cycle of input data. Once identified, the smart card or other computing device can enter into a protective mode, a completely broken card mode, or initiate some other security action to stop the extraction of information.

Figure 2:
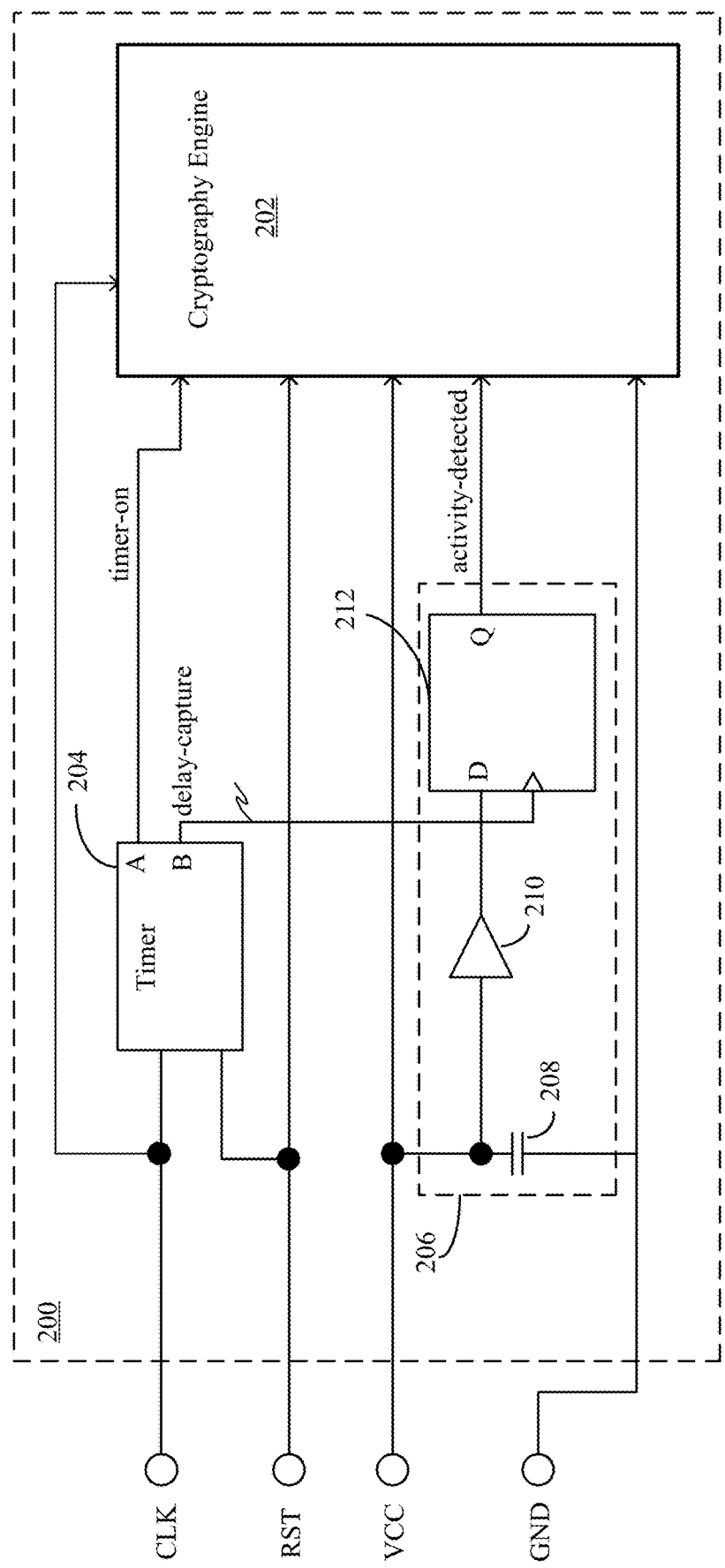
FIG. 2 shows an example hardware implementation of a repetitive SCA countermeasure using a capacitive delay.

FIG. 2 shows an example hardware implementation of a repetitive SCA countermeasure using a capacitive delay. As mentioned above, a repetitive SCA countermeasure using a capacitive delay can include a timer circuit coupled to a clock signal pin and a reset signal pin; and a capacitive delay circuit coupled to a power signal pin and a ground signal pin, wherein the timer circuit receives a clock signal from the clock signal pin and a reset signal from the reset signal pin and outputs a delay-capture signal to the capacitive delay circuit, wherein the capacitive delay circuit receives a power signal from the power signal pin, a ground signal from the ground signal pin, and the delay-capture signal from the timer circuit, and outputs an activity-detected signal to a computation engine of a computing device. Referring to the specific smart card implementation example of FIG. 2, a smart card 200 can include a cryptography engine 202, a timer circuit 204, and a capacitive delay circuit 206. The timer circuit 204 is coupled to a clock signal pin (CLK) and a reset signal pin (RST) of the smart card 200. The timer circuit 204 receives a clock signal from the clock signal pin and a reset signal from the reset signal pin and outputs a delay-capture signal to the capacitive delay circuit 206. The pins may receive the clock and reset signals from a card reader or test jig in which the smart card 200 is inserted.

The capacitive delay circuit 206 is coupled to a power signal pin (VCC) and a ground signal pin (GND) of the smart card 200. The capacitive delay circuit 206 receives a power signal from the power signal pin, a ground signal from the ground signal pin, and the delay-capture signal from the timer circuit 204, and outputs an activity-detected signal to the cryptography engine 202. The power and ground signals can be received from a card reader or test jig in which the smart card 200 is inserted. In some cases, an "enable" switch can be included between the power signal pin and the capacitive delay circuit 206 that is controlled by an attack-detect enable signal that is set if the countermeasure is to be used and cleared otherwise. Capacitive delay circuit 206 can include a capacitor 208, an amplifier 210, and a latch or flip-flop gate 212. The capacitor 208 is coupled to the power signal pin (VCC) and the ground signal pin (GND). For implementations with the enable switch, the enable switch can be between the power signal pin and the capacitor 208. The amplifier 210 is coupled to the capacitor 208 to sense the charge on the capacitor 208. The amplifier can be a high-gain amplifier and amplify the charge (e.g., voltage magnitude) sensed on the capacitor 208, capturing the state of the capacitor and sets the latch or flip flop gate 212 after the capacitor 208 has charged to a threshold level. The latch or flip flop gate 212 is coupled to the amplifier 210 to receive an output of the amplifier 210 and is coupled to the timer circuit 204 to receive the delay-capture signal. An output of the latch or flip-flop gate 212 is coupled to the cryptography engine 202 to provide the activity-detected signal. The latch or flip-flop gate 212 can be a D flip-flop.

The cryptography engine 202 can include one or more processing cores and memory storage. The processing cores may be implemented using application specific integrated circuits (ASICs), field programmable gate arrays (FPGA), microprocessors or other hardware circuitry. Common cryptography algorithms implemented in the cryptography engine include AES, ECC, variations of DES, and RSA. The memory storage can include nonvolatile memory (NVM) and volatile memory. Examples of NVM include flash memory, various read-only memories (ROM, PROM, EPROM, EEPROM), phase change memory, magnetic and ferromagnetic/ferroelectric memories (CeRAM, MRAM, FeRAM). Examples of volatile memory include random-access memories (RAM, DRAM, SRAM).

The illustrated smart card 200 can initiate a countermeasure response based on the activity-detected signal received by the cryptography engine 202, which can be the result of the smart card being powered for an amount of time longer than typical operation. A countermeasure response can then be initiated based on the activity-detected signal received by the cryptography engine 202. In some cases, the timer circuit 204 is coupled to the cryptography engine 202 to output a timer-on notification to the cryptography engine 202. The timer-on notification can be used by the cryptography engine 202 to signal to read the input from the capacitive delay circuit 206. An illustrative scenario is provided as follows.

Upon insertion of smart card 200 into a card reader (or test jig), the RST signal goes high and timer circuit 204 begins operation. Initially, upon first insertion or if a sufficient amount of time has lapsed since the previous insertion of smart card 200 in to the card reader or test jig, the charge on the capacitor 208 is minimal. Thus, when timer circuit 204 sends a delay-capture signal to flip-flop 212 to cause the flip-flop 212 to capture its input value, the latch or flip-flop gate 212 outputs a low value to the cryptography engine 202, which indicates that an attack has not (yet) been detected.

Capacitor 208 begins to charge after the smart card 200 is inserted into the card reader because of the power supplied to the card 200. As the capacitor 208 is charged, the amplifier 210 amplifies the signal (e.g., voltage magnitude) provided to the latch or flip-flop gate 212. Once the capacitor 208 charges to a value above a threshold, the input to the latch or flip-flop gate 212 may switch to a high value. The next time timer circuit 204 sends a delay-capture signal to the latch or flip-flop gate 212 to cause the latch or flip-flop gate 212 to capture its input state, the input state will be high. In this state, the latch or flip-flop gate 212 will output a high activity-detected value to alert cryptography engine 202 that an attack is underway.

As mentioned above, when the timer circuit further provides a timer-on notification, the cryptography engine (or specified control portion of the smart card) can read the value output by the latch or flip-flop gate 212.

The size/capacitance of the capacitor can be selected to support a delay of an amount of time (e.g., time to charge to a threshold level), for example, 3-5 seconds. If access to the smart card 200 is requested within a few seconds of a prior access, or a prior reset operation, the charge on the capacitor continues to charge and is sufficient to cause the output of the latch or flip-flop gate 212 to be high, which when read by the cryptography engine (or specified control portion of the smart card), can be used to initiate a countermeasure. If the capacitor 208 is sufficiently discharged, the state of the latch or flip-flop gate 212 is low, and the output of the flip-flop is low, indicating no attack by this SCA method (and the access was safe).

The particular countermeasure implemented can be to obfuscate or alter the data in some manner as determined by the smart card designer. For example, the smart card can be disabled, performing no response to the input data, or can be switched from performing a proper response to performing an improper response. An improper response refers to the responses intended to create power signatures which are indicative of a different key or a random key.

Incorporating the capacitive delay circuit into a smart card can cost an attacker approximately 80 times more time to capture the data needed to extract the keys through a SCA such as differential power analysis (DPA). In addition, by increasing the discharge time of the capacitor, the amount of time needed to extract the keys during an attack directly increases.

In another embodiment of the repetitive SCA countermeasures described herein, one or more comparators can be used. The repetitive SCA countermeasure can include counting the number of times the same information cycle has been received by the smart card. Receiving the same information cycle repetitively can indicate an attack.

Figure 3:
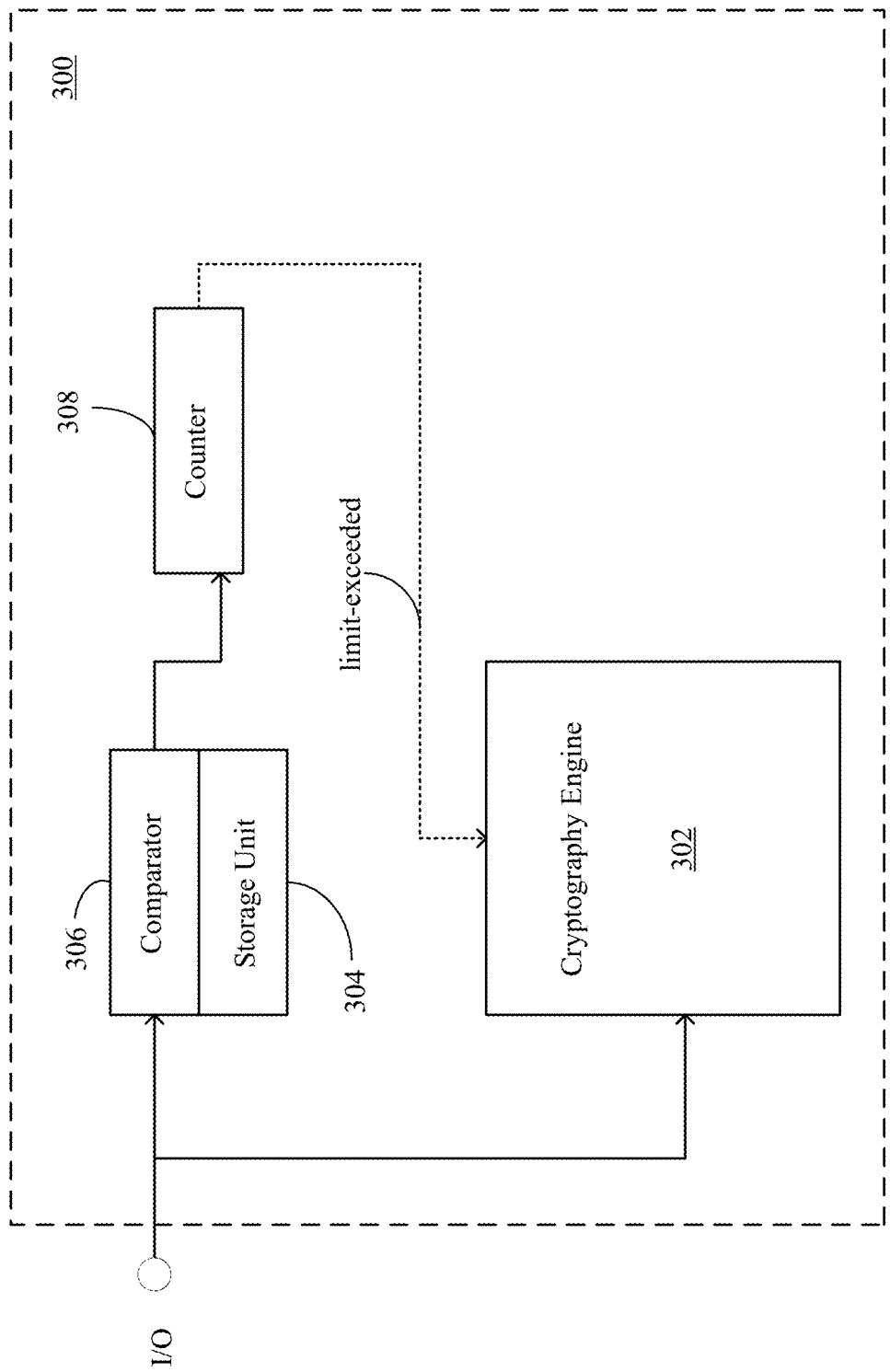
FIG. 3 shows an example implementation of a repetitive SCA countermeasure using a comparator.

FIG. 3 shows an example implementation of a repetitive SCA countermeasure using a comparator. As mentioned above, a repetitive SCA countermeasure using a comparator can include one or more comparators coupled to an I/O pin of a computing device; a storage unit coupled to each comparator; and a counter coupled to receive an output of the comparator, an output of the counter being coupled to a computation engine to provide a limit-exceeded signal to the computation engine. Referring to the specific smart card implementation example of FIG. 3, a smart card 300 can include a cryptography engine 302, a storage unit 304, a comparator 306, and a counter 308. The storage unit 304 can be a register, such as a first-in-first-out (FIFO) register, or suitable nonvolatile memory (NVM). The storage unit has a size to store an information cycle received via the I/O pin. Although specific reference is made to the described countermeasure being applied to a smart card, the circuitry is applicable to any computing device that may be subject to a repetitive attack via a signal line.

Comparator 306 can receive one complete information cycle at a time from the I/O pin and can output a signal indicating a match. The information cycle can be a block of data of predetermined length, for example, 64 bits. In some cases, the comparator is a 64-bit comparator. In some cases, the comparator includes a plurality of smaller comparators, each able to handle a certain number of bits of the block of data for an information cycle. Storage unit 304 is coupled to comparator 306 and stores the previously-received information cycle. Storage unit 304 may be part of the memory storage within cryptography engine 302, part of other memory storage on the smart card 300, or a separate storage on the smart card 300. Comparator 306 compares the previously stored information cycle in the storage unit 304 to the newly-received information cycle. Counter 308 will increment if the comparator outputs a signal indicating that the newly-received information cycle matches the previously stored information cycle.

In FIG. 3, the smart card 300 may receive input data via an I/O pin such as described with respect to FIGS. 1A and 1B. The input data can include information cycles representing input data such as, but not limited to, plaintext or ciphertext. When a smart card is inserted into a card reader or test jig (or other device), an exchange of information cycles begins. The smart card 300 can detect whether a newly-received information cycle is a repetitive transmission of a previous information cycle using the described countermeasure circuitry.

A single match between the newly-received information cycle and the previously stored information cycle does not necessarily indicate an attack. The smart card designer can determine how many repetitive information cycles are acceptable before implementing a countermeasure. For example, an attack may be considered likely if there have been more than 3 repetitive information cycles since the last reset. If the counter 308 exceeds the predetermined level of acceptability, the counter (or other circuitry coupled to the counter) can output limit-exceeded signal to the cryptography engine 302 to indicate an attack. The limit-exceeded signal can be used to generate an abort, interrupt, or halt signal. Similar to the example embodiment in FIG. 2, the countermeasure can include obfuscating or altering the data in some manner as determined by the smart card designer, shutting down the device, or other countermeasure.

The number of comparators and storage units used in a smart card can vary based on the expected sophistication of potential attackers. For example, an attacker may learn that the smart card is disabled after 3 attempts to send the same information cycle. The attacker may begin sending a pattern of two repetitive information cycles followed by a different information cycle to access the smart card, referred to herein as a "multi-input" repetitive attack.

Figure 4A:
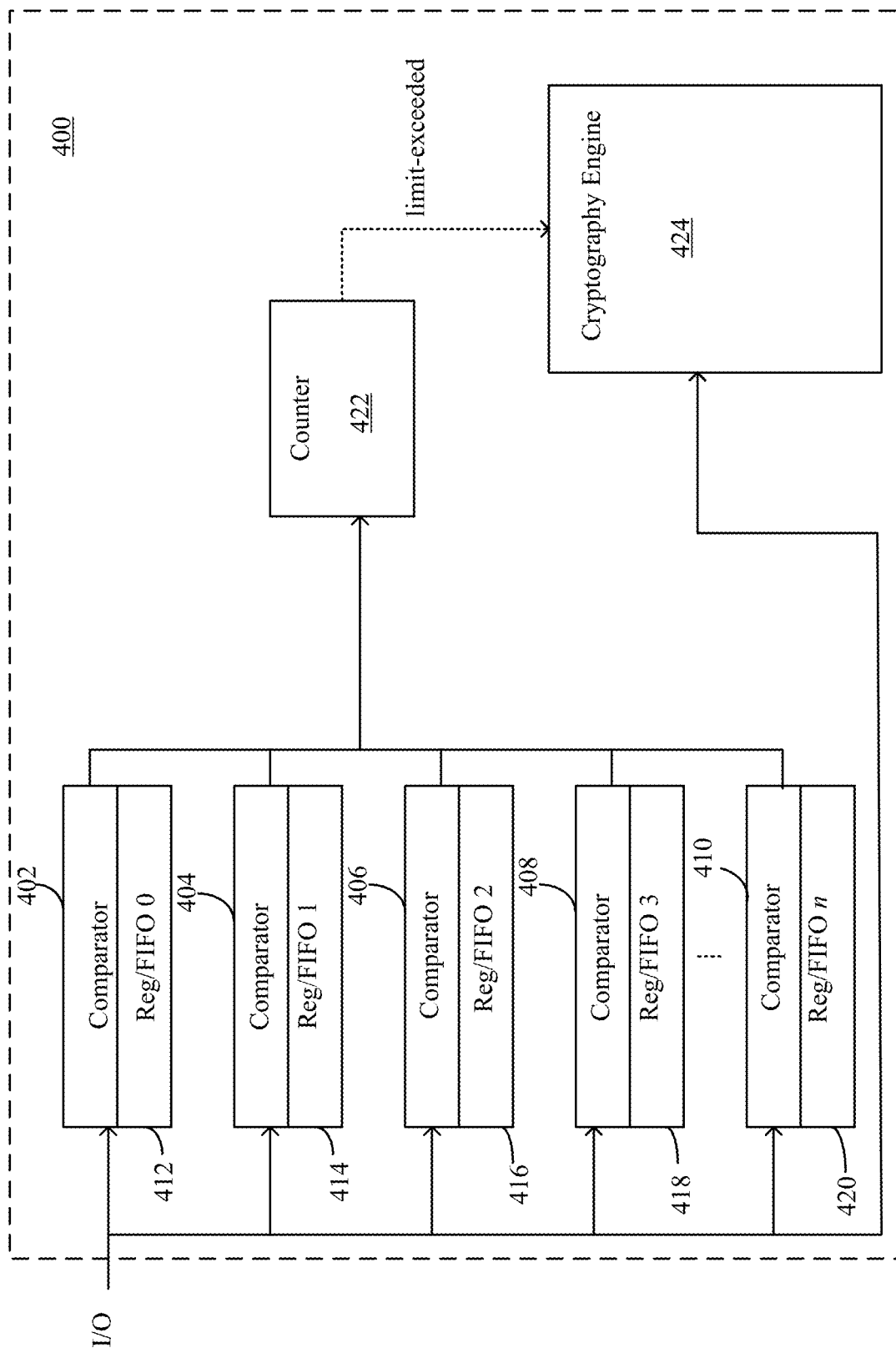
FIGS. 4A and 4B show example implementations of a repetitive SCA countermeasure suitable for multi-input repetitive attack.
Figure 4B:
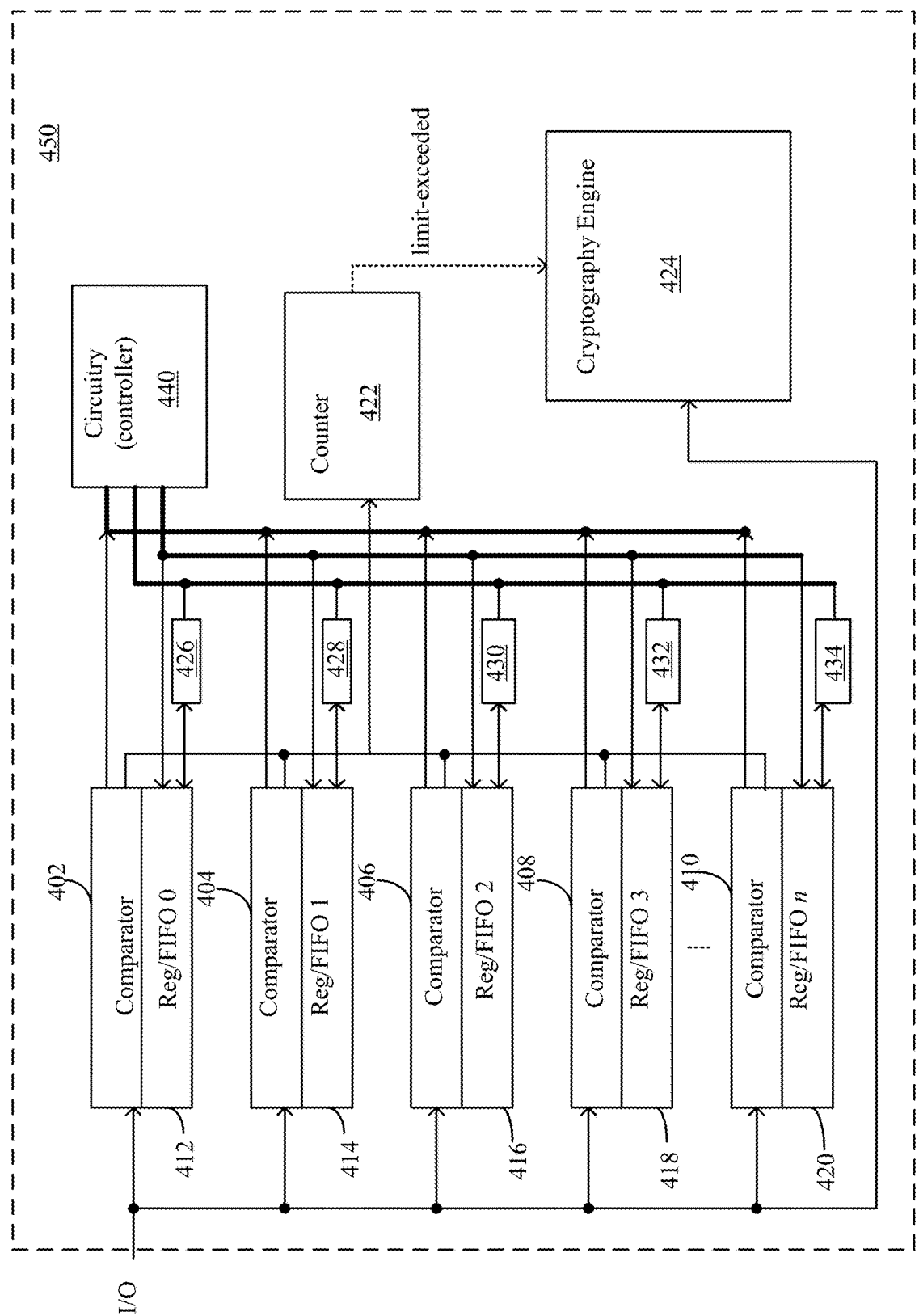

FIGS. 4A and 4B show example implementations of a repetitive SCA countermeasure suitable for multi-input repetitive attack. Although reference is specifically made to smart cards, the example implementations of a repetitive SCA countermeasure shown in FIGS. 4A and 4B are applicable to any computing device receiving input and subject to multi-input repetitive attacks. Referring to FIG. 4A, a smart card 400 can include a plurality of comparators and storage units, for example n comparators (402, 404, 406, 408, 410) coupled to n corresponding storage units (412, 414, 416, 418, 420). Each comparator can receive an information cycle block and output an activity-detected signal to a counter 422. The counter 422 is coupled to receive the outputs from each comparator and output a limit-exceeded signal to a cryptography engine 424.

As described with respect to FIG. 3, the storage units (e.g., 412, 414, 416, 418, 420) can be registers, such as a D-type register, or suitable nonvolatile memory (NVM). Each storage unit has a size to store an information cycle received via the I/O pin. In addition, in some cases, the comparator is a 64-bit comparator. In some cases, the comparator includes a plurality of smaller comparators, each able to handle a certain number of bits of the block of data for an information cycle. The plurality of storage units (e.g., 412, 414, 416, 418, 420) may be part of the memory storage within cryptography engine 424, part of other memory storage on the smart card 400, or a separate storage on the smart card 400. Each comparator (e.g., 402, 404, 406, 408, 410) compares the previously stored information cycle in the storage unit (e.g., 412, 414, 416, 418, 420) associated with that comparator to the newly-received information cycle. Counter 422 will increment if any of the comparators output a signal indicating that the newly-received information cycle matches the previously stored information cycle.

Each comparator of the n comparators (402, 404, 406, 408, 410) can receive a complete information cycle from the I/O pin. In some cases, the comparators are connected in series and the comparators are filled with incoming information cycles similar to first-in-first-out operation before performing the comparison operation. In some cases, the comparators are connected in parallel such that the incoming information cycles are directed to appropriate comparators before performing the comparison. Either configuration may be operated such that not all comparators are filled and used in a comparison during operation.

In some cases, more than one counter may be used; and the value for the limit given to the counter taking the configuration into consideration.

Referring to FIG. 4B, the countermeasures included in smart card 450 can be similar to those described with respect to smart card 400 in FIG. 4A, but includes circuitry 440 that directs the appropriate input data to be stored in the storage units. The circuitry 440 is coupled to each comparator (402, 404, 406, 408, 410) to receive the output of that comparator of a comparison between a received input data of an information cycle and input data stored in the corresponding storage unit (412, 414, 416, 418, 420); and if the output of that comparator indicates no match, store that received input data in a selected one of the storage units.

Within counter 422 can be a set of counters, each corresponding to one of the comparators. A single match between the newly-received information cycle and the previously stored information cycle does not necessarily indicate an attack. The smart card designer can determine how many repetitive information cycles are acceptable before implementing a countermeasure. For example, an attack may be considered likely if there have been more than 3 repetitive information cycles since the last reset. If the counter 422 exceeds the predetermined level of acceptability (over all counters or by a single counter within counter 422), the counter (or other circuitry coupled to the counter) can output a limit-exceeded signal, such as described with respect to FIG. 3, to the cryptography engine 424 to indicate an attack; and an appropriate countermeasure can be taken. In some cases, no countermeasure is taken in response to the limit-exceeded signal. For example, a countermeasure may be taken upon receipt of a certain number of limit-exceeded signals.

In some cases, the circuitry 440 can determine whether any storage units (412, 414, 416, 418, 420) are not storing prior input data; if all the storage units are all storing prior input data, the circuitry 440 can select a random storage unit of the plurality of storage units and load the received input data of the information cycle to the random storage unit; and if any of the storage units are not storing prior input data can select one of the empty storage units and load the received input data of the information cycle to an empty storage unit. The selection of an empty storage unit may be at random, according to a predetermined pattern, or sequential. In some cases when all the storage units are storing prior input data, the circuitry 440 can select a storage unit according to a predetermined pattern instead of at random. In some cases, each of the n storage units (412, 414, 416, 418, 420) are coupled to a corresponding full/empty indicator device (426, 428, 430, 432, 434). The full/empty indicator devices can be coupled to the circuitry 440 to indicate whether the storage unit is empty of an information cycle or full of an information cycle.

Figure 5:
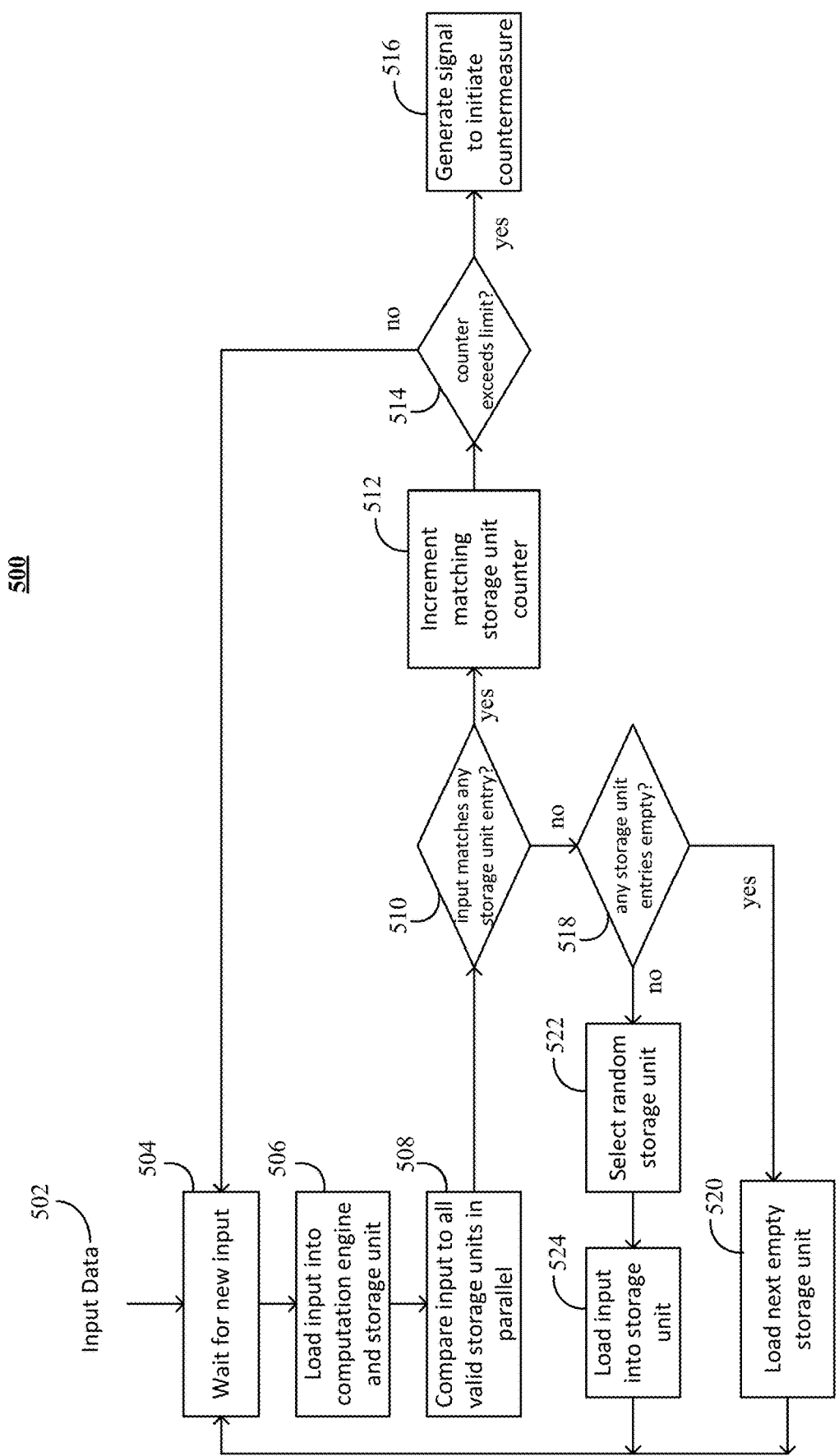
FIG. 5 shows a method that may be carried out by a repetitive SCA countermeasure using one or more comparators.

FIG. 5 shows a method that may be carried out by a repetitive SCA countermeasure using one or more comparators. Method 500 may be carried out by any computing device incorporating repetitive SCA countermeasure. In some cases, the method 500 illustrated in FIG. 5 may be carried out by a smart card such as described with respect to smart cards 300, 400, and 450 of FIGS. 3, 4A, and 4B. The described repetitive SCA countermeasure can begin when data is first input into the smart card (or other computing device) using, for example, an I/O connection pin (502). The smart card can be in a waiting state until the new input is received (504). Once new input is received, the new input is loaded into both the computation engine (e.g., cryptography engine) and a storage unit (506). Next, the input data is compared to all valid (i.e., non-empty) storage units (508). This step can occur in a parallel process in which the input data can be compared to all valid storage units at the same time—whether there is a single storage unit such as described with respect to smart card 300 or a plurality of storage units such as described with respect to smart cards 400 and 450.

When the input data matches any data already stored in any valid storage unit (510), a counter will increment (512). The counter can be checked to see if the number of matches exceeds a limit (514). If the number of matches does exceed the limit, a signal is generated to initiate a countermeasure (516). The signal can be an abort signal, an interrupt signal, or a signal to halt cryptographic operation, as some examples. If the number of matches does not exceed the limit (as determined during operation 514), the process can return to operation 504 to wait for new input.

If, during operation 510, the input data does not match any data already stored in any valid storage unit, then the smart card/computing device can check if there are any empty storage units (518). When there are empty storage units, the input data can be loaded into the next empty storage unit (520) and the process can next return to operation 504 to wait for new input. When there are no empty storage units, a storage unit can be selected at random or by some predetermined pattern (522) and the input data can be loaded into the selected storage unit (524). The process can then return to operation 504 to wait for new input.

In some cases, the one or more comparators and/or the method 500 itself may be implemented in software stored on a computing device and executed by a processor of the computing device. For example, the computer-implemented method can include receiving an input data of an information cycle; comparing the input data to one or more prior input data; incrementing a counter when the input data matches any of the one or more prior input data; and upon the counter reaching or exceeding a limit, generating a signal to initiate a repetitive SCA countermeasure. In some cases, the method further includes, when the input data of the information cycle does not match any of the prior input data, checking if there are empty storage units; and when there are empty storage units, loading the input data into a next empty storage unit and when there are no empty storage units, selecting a storage unit and loading the input data into the selected storage unit. The selecting of the storage unit can include randomly selecting one of a plurality of storage units. For example, a selected storage unit can be selected using a random number generator to generate the selection pattern). In some cases, the selected storage unit can be selected according to a predetermined pattern.

Figure 6:
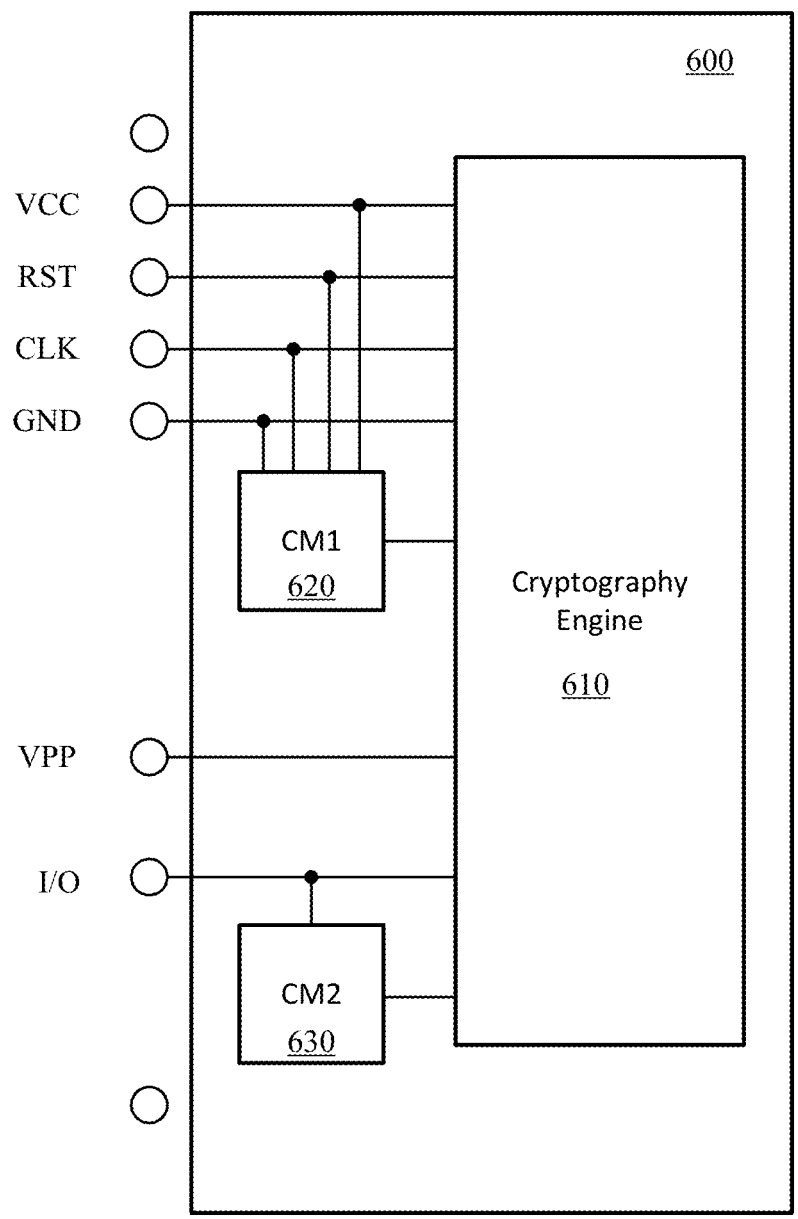
FIG. 6 shows a representational diagram of a smart card implementing repetitive SCA countermeasures.

FIG. 6 shows a representational diagram of a smart card implementing repetitive SCA countermeasures. Referring to FIG. 6, a smart card chip 600 can include a cryptography engine 610 and pads for VCC (power supply input), RST (can be used by itself or in combination with an internal reset control circuit), CLK (clocking or timing signal), GND (ground—a ground or VSS signal), VPP (programming voltage input), I/O (input or output for serial data to the microcontroller inside the smart card), and optionally two additional connection pads for application specific inputs (or outputs) or future standards, as described with respect to FIGS. 1A and 1B. Smart card chip 600 can include multiple SCA countermeasures, including countermeasure 1 (CM1) 620 and countermeasure 2 (CM2) 630. CM1 620 may provide a repetitive SCA countermeasure using a capacitive delay such as described with respect to FIG. 2, including a timer circuit and a capacitive delay circuit. CM2 630 may provide a repetitive SCA countermeasure using one or more comparators such as described with respect to FIGS. 3-5. One or both countermeasures may be enabled for a particular chip.

Although smart cards and cryptography engines are specifically described and illustrated herein, some of the described SCA countermeasures can be applied to any computing device that receives signals such as a clocking or timing signal, a reset signal, a ground signal, and a power supply input signal. In addition, some of the described SCA countermeasures can be applied to any computing device that receives input signals that are input in information cycles.

As illustrated in the above countermeasures, as well as explained in the background, countermeasures against attacks may include detection components and response components. A detection component includes hardware and/or software that determines a possible attack is occurring (e.g., which may be a binary determination of attack conditions being tripped or a determination with probabilities providing confidence values). A response component includes hardware and/or software that performs an action in response to a detection component indicating that the attack is occurring (with or without a certain level of confidence). The response component may be a switch that resets or shuts down the sensitive circuitry (e.g., cryptography engine or other circuitry handling sensitive information), or even more complex circuitry that changes characteristics of the sensitive circuitry, as some examples.

The detection component may determine that a possible attack is occurring by counting the number of times an event has occurred and/or the rate at which the event is occurring. These events may occur many times (thousands or even tens of thousands of times over the lifetime of a device). There are two types of events referred to herein when describing event counting. One is referred to as an "event" (or "event of interest") and the other is referred to as an "error event". The "event" refers to any signal being monitored (and which may be subject to a repetitive attack). Events can include, but are not limited to key usage, crypto engine activation, exceptions (e.g., missed/bad connections to a peripheral or other device), privilege activities (e.g., request for special privileges, extension of privileges, revoking of privileges), and missed or bad execution. The "error event" refers to an occurrence that could disrupt the monitoring for events, such as loss of power.

In some detection mechanisms, nonvolatile storage is used to track event counts. However, the number of event counts can become quite high and storing such high counts in nonvolatile storage can be costly. For example, filling nonvolatile memory can cause an error that either disables the use of the card or allows the attacker to come away with key information, such as a user's pin for a checking account card. Other detection mechanisms may try to offload some of the counting to volatile storage, but this volatile storage may lose the memory of the attack when a loss of power event occurs.

Figure 7:
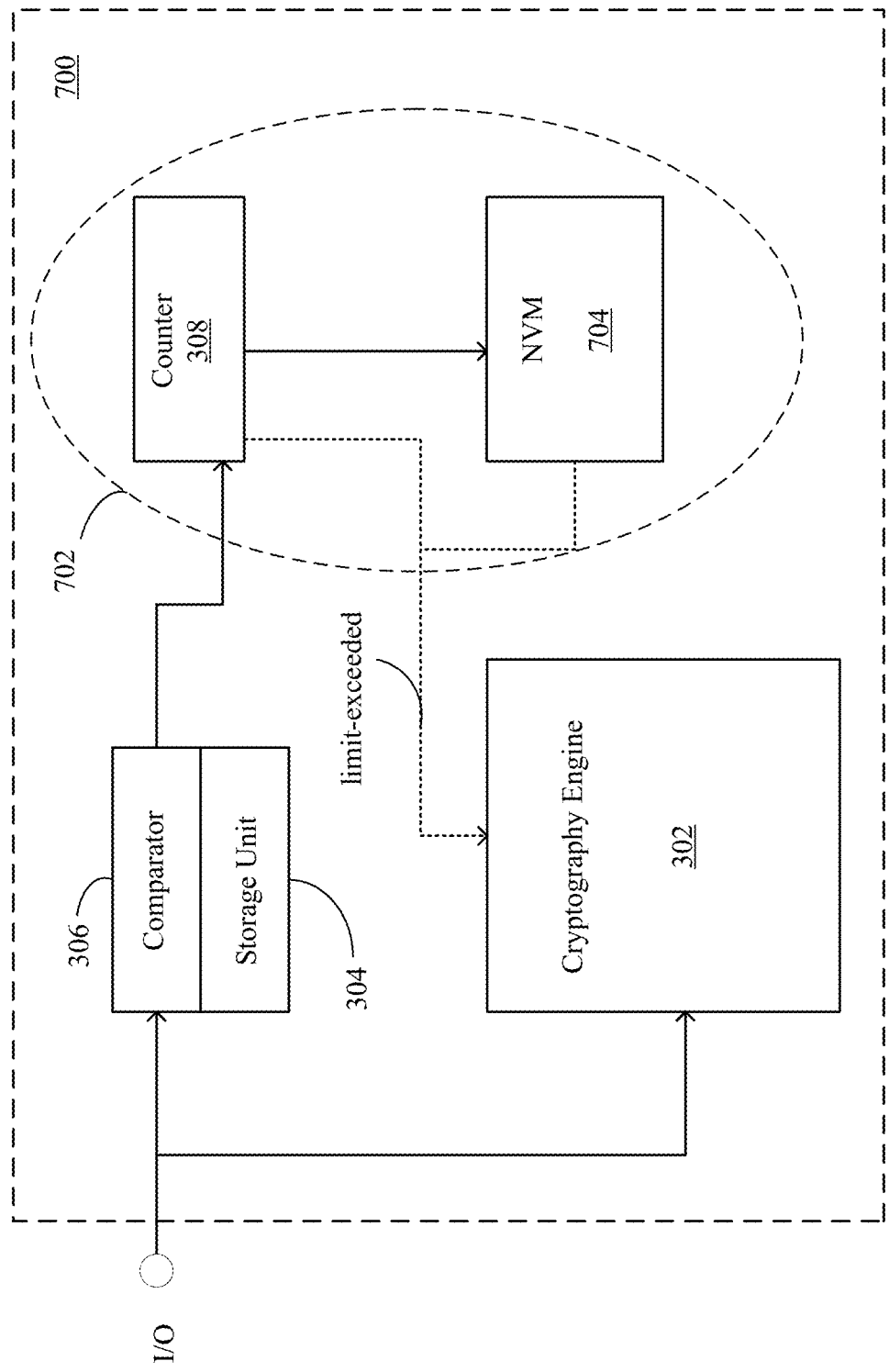
FIG. 7 shows an example implementation of a system with repetitive SCA countermeasure and reliability measures.

Any of the smart card embodiments shown and described with respect to FIGS. 3, 4A, and 4B can include reliability measures for error events when tracking event counts. For example, FIG. 7 illustrates a smart card similar to smart card 300 of FIG. 3 with reliability measures. Here, FIG. 7 shows an example implementation of a system with repetitive SCA countermeasure and reliability measures. Smart card 700 includes comparator 306 coupled to an I/O pin of the smart card 700. Storage unit 304 is coupled to the comparator 306. A counter 702 is coupled to receive an output of the comparator and coupled to output a limit exceeded signal to a computation engine 302. In this example, the computation engine 302 is a cryptography engine. Counter 702 includes a volatile counter 308 and a nonvolatile storage (NVM) 704. The NVM 704 stores a bit for each top volatile count number of events identified by the volatile counter 308.

Storage unit 304 and NVM 704 may be part of the memory storage within cryptography engine 302, part of other memory storage on the smart card 700, or a separate storage on the smart card 700 (or even each be different memories so that one may be part of the memory storage within cryptography engine 302 and the other being part of other memory storage on the smart card 700). In some cases, the combination of volatile and nonvolatile storage can reduce the footprint of the mitigation circuitry.

The described methods and systems include both non-volatile and volatile devices, where when an error event such as a loss of power occurs, certain techniques—the reliability measures—are carried out to minimize disruption to repetitive attack detection.

When tracking events of interest, such as repetitive events indicative of an attack (as in SCA), the volatile counter 308 increments each time an event is detected. The counter 308 continues to increment until a top volatile count is reached, at which point a single bit of memory is written to NVM 604. When a certain number of events are detected, a suitable response may be implemented. The volatile counter 308 and NVM 704 operate in concert with each other to maintain the integrity of the count of certain events so that, in the case of a side channel or fault injection attack, the attack can be recognized as the attack is occurring. In some cases, a limit exceeded signal is provided to the computation engine 302 when an output of the volatile counter 308 reaches or exceeds a threshold. In other cases, the limit exceeded signal is provided to the computation engine 302 when a total count from the volatile counter 308 and the NVM 704 reaches or exceeds a threshold. In some cases, different limit exceeded signals may be provided such that certain limit exceeded signals are based directly from a value of volatile counter 308 and certain signals are based directly from the total count obtained from the NVM 704.

Through reliability measures described herein, volatile counter 308 and NVM 704 can also maintain the integrity of the count during other types of adversarial attacks such as power loss. FIGS. 8A-8C and 9 provide details on tracking events of interest.

Figure 8C:
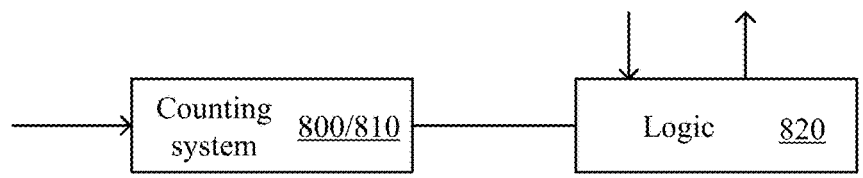
FIG. 8C shows a representative system with a counting system and logic.

FIG. 8A shows an example implementation of a counting system with a volatile counter and nonvolatile storage; FIG. 8B shows an example implementation of a counting system with two volatile counters, a count checker, and nonvolatile storage; and FIG. 8C shows a representative system with a counting system and logic.

Turning to FIG. 8A, a counting system 800 can include a volatile counter 802 and a nonvolatile storage 804. The volatile counter 802 may be implemented for example using flipflops, latches, SRAM, or other volatile memory. The nonvolatile storage 804 may be implemented for example using MRAM, CeRAM, or other suitable forms of nonvolatile memory. The volatile counter 802 can be coupled to an I/O (input/output) pin to count (by increments or decrements) an event each time the event is detected. As illustrated with respect to FIG. 7, a counter may be coupled to an I/O via a comparator. An event may be a request for a pin to a debit or credit card, an authorization, an exception to allow a transaction to be completed without a pin, or some other event that, when repeatedly performed may indicate an attack. Once the count in the volatile counter 802 reaches a top volatile count, a single bit is written in the nonvolatile storage 804. For example, if the top volatile count is one thousand, once the count in the volatile counter 802 reaches one thousand, a single bit is written to the nonvolatile storage 804. The volatile counter 802 may be reset after the count is recorded in the nonvolatile storage 804. In some cases, the system can confirm that the single bit has been written to the nonvolatile storage. The example above features a top volatile count of one thousand, however the top volatile count may be programmable and may be changed, for example, by a user-initiated command, depending on the system requirements.

By utilizing a volatile counter 802, the count does not have to be stored in the nonvolatile storage 804 every time an event is detected. This is useful is situations such as where nonvolatile storage 804 is limited and in situations such as where the nonvolatile storage 804 is one-time programmable (OTP) memory, as examples. Furthermore, by having a single bit in the nonvolatile storage 804 represent a top volatile count (e.g., one thousand), the system can count many more events than otherwise would be possible for the amount of available storage.

Turning to FIG. 8B, a counting system 810 can include redundant volatile counters to support count integrity. For example, a first volatile counter 812 and a second volatile counter 814 can be provided in parallel and receive a same input signal, for example, through being coupled to an I/O (input/output) pin. Each time an event is detected, the first volatile counter 812 increments and the second volatile counter 814 decrements. In some cases, both the first volatile counter 812 and the second volatile counter 814 increment at each detected event. Once the first volatile counter 812 reaches a top volatile count or the second volatile counter 814 reaches a bottom volatile count (or in cases in which the second volatile counter 814 increments, once the second volatile counter 814 reaches the top volatile count), the count checker 816 checks the count of the first volatile counter 812 against the count of the second volatile counter 814 to determine whether the counts of the first and second volatile counters 812, 814 correspond to one another. In some cases, the count checker 816 includes a comparator.

If the counts of the first and second volatile counters 812, 814 do correspond to one another, a single bit is written to the nonvolatile storage 818 that represents the top volatile count. The volatile counters 812, 814 may be reset after the count is recorded in the nonvolatile storage 818. If the counts of the first and second volatile counters 812, 814 do not correspond to one another, a consistency error signal may be provided from the count checker 816 to a counter-measure processor that may initiate a counter measure action or some other restriction to operation. In some cases, in which the counts of the first and second volatile counters 812, 814 do not correspond to one another, the occurrence may be considered to be an "error event" and a single bit is be written to the nonvolatile storage 818 that represents the top volatile count. The consistency error signal may be logged as well. For example, the count checker 816 may store an indication that the consistency error signal has been output in a log.

As illustrated in FIG. 8C, readout circuitry and control logic 820 can be coupled to counting system (e.g., counting system 800 or counting system 810). The readout circuitry and control logic 820 can be configured to control operations of the at least one volatile counter (e.g., counter 802 or one or both of counters 812 and 814), during an error event and determine a total number of events.

During the tracking/counting operations, an error event may occur. The error event may be caused by a loss of power event or some other error event which may be caused by an attack. In one scenario, upon receiving the error event of the loss of power event, the volatile counter (e.g., volatile counter 802, 812, 814) is powered by a backup power source for a predetermined length of time. In some cases, all bits of the volatile counter are maintained by back-up power. In some cases, one or more significant bits are maintained. In some cases, upon receiving an error event, a bit is written to nonvolatile storage regardless of the value in the volatile counter; and the volatile counter may not be powered by the backup power source for the duration of the error event. In another scenario, upon receiving an error event, the volatile counter is powered by a backup power source at least until a snapshot of the count in the volatile counter is stored in the nonvolatile storage. A snapshot may be a representation of the exact number of events counted in the volatile counter.

Figure 9:
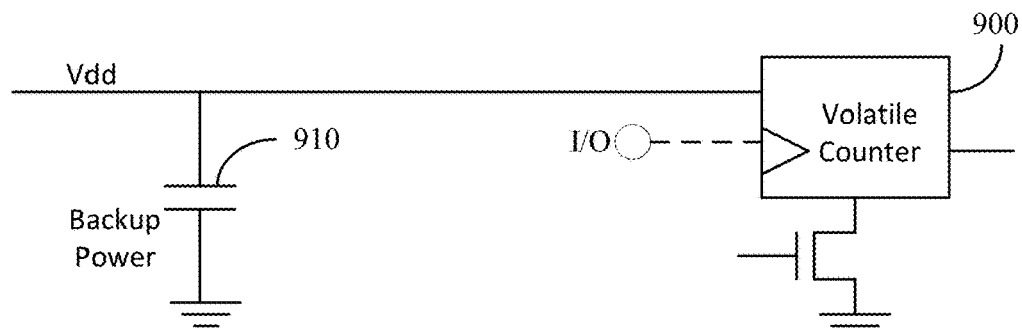
FIG. 9 shows an example implementation of a volatile counter coupled to a backup power source.

FIG. 9 shows an example implementation of a volatile counter coupled to a backup power source.

Referring to FIG. 9, a volatile counter 900, which may be configured as any of volatile counters 308, 802, 812, 814 of FIG. 7, 8A or 8B, can be coupled to a backup power source 910. The backup power source 910 can be a capacitor. The backup power source can also be powered by an alternate power domain. For example, Vdd can supply power to the chip and volatile counter while another power domain such as Vdd2 or a battery voltage Vbat (not shown) can supply power to the backup power supply.

The size/capacitance of the capacitor (or other backup power source 806) can be selected to support holding a voltage level for a predetermined amount of time, for example, a few seconds, one minute, five minutes, ten minutes, or twenty minutes, as examples. In some cases, the predetermined length of time may be designed to last until a primary power source is expected to return or until the attack ceases. In some cases, the predetermined length of time is an amount of time sufficient to write a single bit to the nonvolatile storage such that in response to an error event, a single bit can be written to the nonvolatile storage. In some cases, the predetermined length of time is an amount of time sufficient to write a snapshot of the count to the nonvolatile storage such that in response to the error event, the snapshot can be written to the nonvolatile storage. In some cases, the predetermined length of time is an amount of time sufficient to maintain at least a significant bit of the count for the volatile counter during a power loss (see e.g., FIGS. 12A and 12B and corresponding description).

Figure 10A:
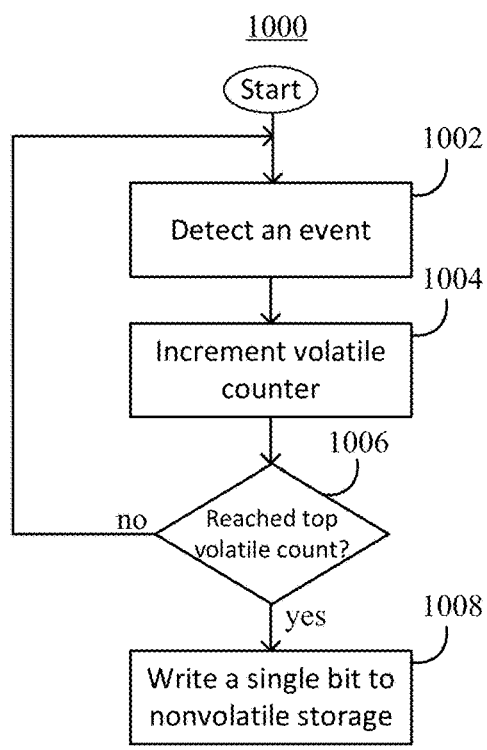
FIGS. 10A and 10B show general operation of counting systems used to track events to count events of interest.
Figure 10B:
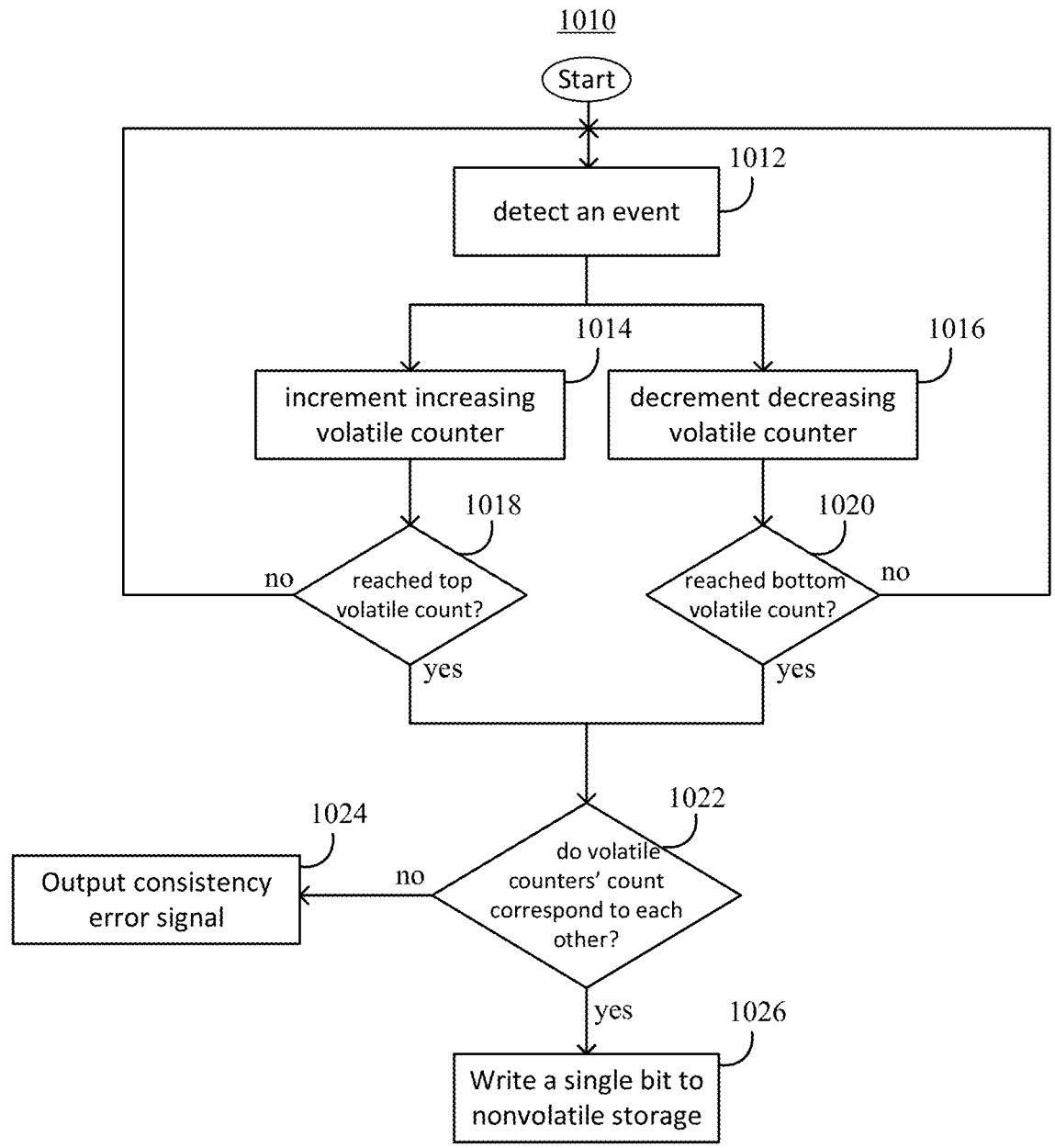

FIGS. 10A and 10B show general operation of counting systems used to track events to count events of interest. FIG. 10A shows a method that may be carried out by counting system 800 of FIG. 8A; and FIG. 10B shows a method that may be carried out by counting system 810 of FIG. 8B. In general, a counting system increments a volatile counter each time an event is detected; and when a count of the volatile counter reaches a top volatile count, a single bit is written to a nonvolatile storage.

Referring to FIG. 10A, events of interest can be tracked by counting system 800 according to process 1000 by detecting an event (1002). The event may be a reset operation, receipt of a set of data, or any other operation being tracked. When an event is detected, a volatile counter is incremented (1004). If a top volatile count has not been reached (1006), the method 1000 resumes waiting to detect another event. If the top volatile count has been reached (1006), a single bit is written to nonvolatile storage (1008). The single bit written to the nonvolatile storage represents the top volatile count. In other words, when counting a total number of events, each bit written to nonvolatile storage represents the number of events corresponding to the top volatile count. If the top volatile count represents one thousand events and there are six bits written to nonvolatile storage, the total number of events represented in nonvolatile storage is six thousand (6*1000=6,000).

Referring to FIG. 10B, events can be tracked by counting system 810 according to process 1010 by using two volatile counters that each detect the same event (1012). The event may be a reset operation, receipt of a set of data, or any other operation being tracked. When an event is detected, an increasing volatile counter is incremented (1014) and a decreasing volatile counter is decremented (1016). In the illustrated process, one counter increments and the other counter decrements, but in some cases, both counters can increment in response to detecting an event.

Both counters can count a same number of events (which can be referred to as a top volatile count number). However, the actual value used to check to see if the top volatile count number of events has occurred may vary. If a top volatile count in the increasing volatile counter is not yet reached (1018), the method 1010 resumes waiting to detect another event. If a bottom volatile count (the value for the decrementing counter) in the decreasing volatile counter is not reached (1020), the method 1010 resumes waiting to detect another event. Once either of the two counts have been reached (1018, 1020) a count checker determines whether the count in the increasing volatile counter and the count in the decreasing volatile counter correspond to each other (1022).

If the count in the increasing volatile counter and the count in the decreasing volatile counter do not correspond to each other (1022), a consistency error signal can be output (1024). In some cases, an indication that the consistency error signal was output can be stored in a log. The consistency error signal can trigger some predetermined action or restriction, for example, a countermeasure action or some other action to protect the integrity of the increasing and decreasing volatile counters and/or determine why the counts in the increasing and decreasing counters do not correspond to one another. If the count in the increasing volatile counter and the count in the decreasing volatile counter do correspond to each other (1022), a single bit is written to a nonvolatile storage (1026).

For example, if the top volatile count is one hundred and the bottom volatile count is zero and the increasing volatile counter has reached one hundred counts and the decreasing volatile counter has reached zero counts, they will be considered to "correspond" to each other. Similarly, for cases where the count checker checks values of the counters prior to a top (or bottom) volatile count number is reached, assuming the same one hundred counts as the top volatile count and bottom volatile count, if the increasing volatile counter has reached seventy counts and the decreasing volatile counter has reached thirty counts, they will be considered to "correspond" to each other even though the determination of whether the volatile counters' count corresponds to each other (1022) would not yet have been reached.

In another scenario, when a user changes the number of the top volatile count, a number of steps must be taken in order to protect the integrity of the total number of events. First, a ratio (R) is computed. R is equal to the new top volatile count (NTVC) divided by the previous top volatile count. Next, the current number of bits used in the nonvolatile storage is divided by R. Any whole number is (at least partially) the new number of bits (NNB) in the nonvolatile storage that will be used. Any remaining decimal (e.g., in cases where the top volatile count is raised) is converted to the new count in the volatile counter. This is accomplished by multiplying the remaining decimal by the NTVC. Any count over the NTVC in the volatile counter (e.g., in cases where the top volatile count is lowered) will be converted to the count in the nonvolatile storage. This is accomplished by multiplying the existing volatile count by the R. Any whole number from this multiplication is added to the NNB in the nonvolatile storage. Any remaining decimal is changed back to the count in the volatile counter by dividing the decimal by R.

As can be seen based on FIGS. 7-9, a system for tracking events to count events of interest can include at least one storage unit to store an incoming input signal to a computation engine of a computing device; at least one comparator to compare a next incoming input signal with a prior incoming signal stored in the storage unit and indicate a match; at least one volatile counter to increment upon the match; a nonvolatile storage coupled to the at least one volatile counter, the nonvolatile storage storing a bit for each top volatile count number of events identified by the at least one volatile counter; a backup power source coupled to the at least one volatile counter; and readout circuitry and control logic coupled to the one or more of the at least one volatile counter and to the nonvolatile storage, the readout circuitry and control logic being configured to control operations of the at least one volatile counter during an error event and determine a total number of events.

Figure 11A:
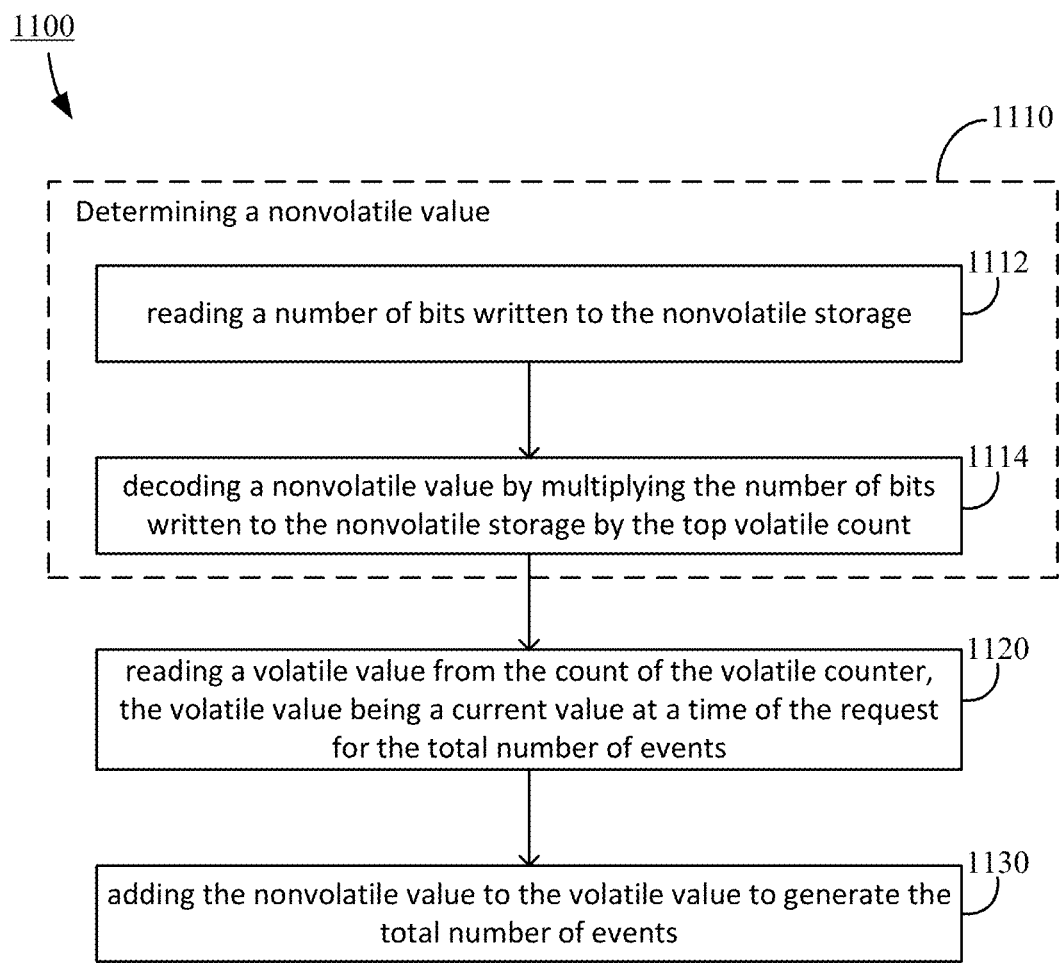
FIGS. 11A and 11B show example methods of tracking events for mitigating repetitive attacks.
Figure 11B:
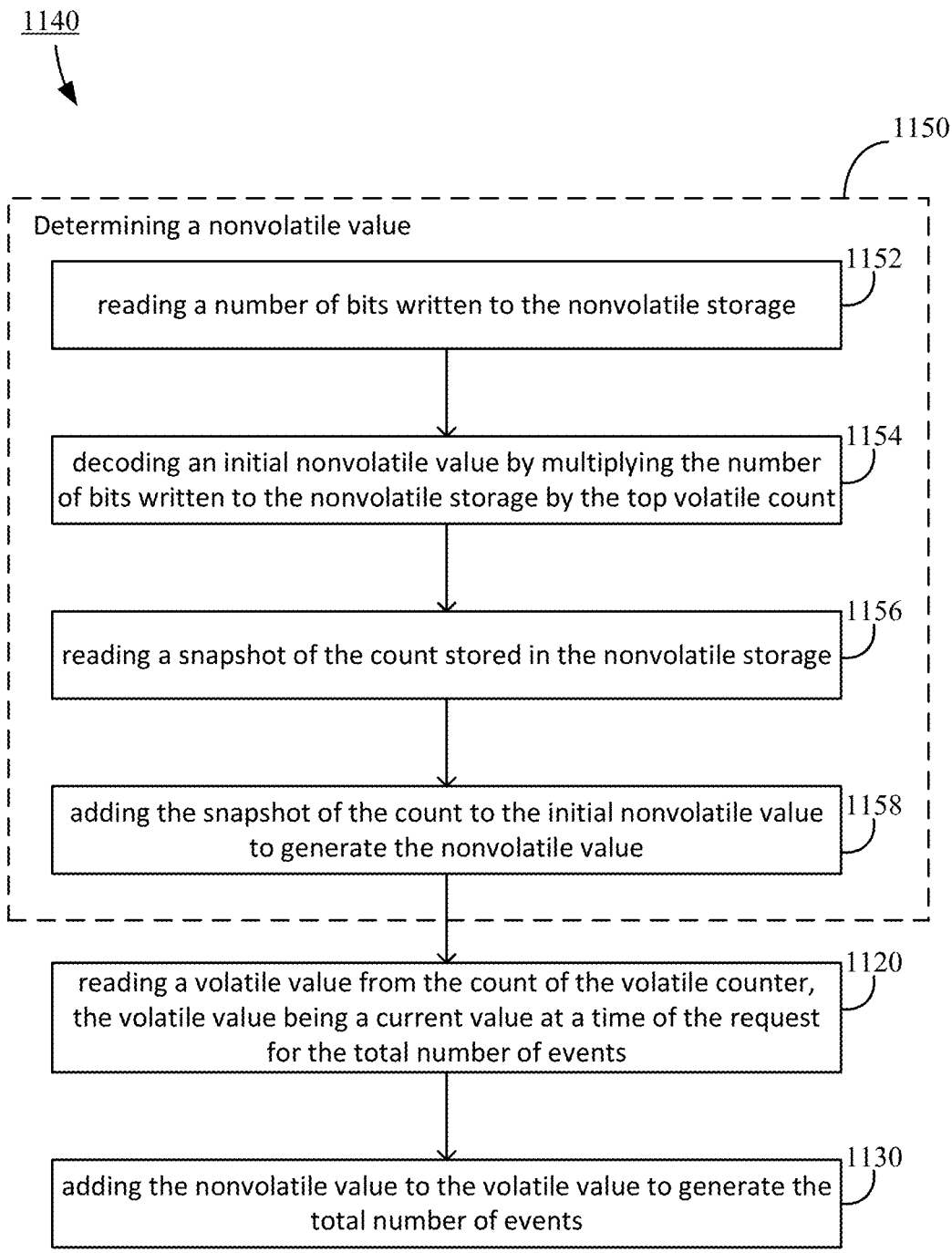

FIGS. 11A and 11B show example methods of tracking events of interest. FIGS. 11A and 11B illustrate two examples of determining a total number of events such that when there is a request for a total number of events (which may be an explicit request or a designed output to a particular destination at particular times or conditions), the total number of events can be provided to a source of the request. As mentioned above, error events may occur during operation of the counting system. The described systems and techniques can adequately track events despite error events including power loss. The specific readout of a total number of events may depend on the particular backup power configuration implemented for the system.

FIG. 11A shows a method that may be carried out by a readout circuitry and control logic for a system in which in response to receiving the error event comprising the loss of power, the volatile counter is powered with a backup power source for a predetermined length of time during the error event. In some of such cases, a bit is written to the nonvolatile storage before the volatile counter loses its count. In other of such cases, the volatile counter is able to maintain at least a significant bit of the count during the power loss duration. In yet other of such cases, the volatile counter is able to maintain its entire count during the time that there is a loss of power and may even continue to increment in response to detecting new events.

As shown in FIG. 11A, a method (1100) of determining the total number of events that have been counted at a time of a request for the count of the total number of events includes determining (1110) a nonvolatile value, reading (1120) a volatile value from the count of the volatile counter, and adding (1130) the nonvolatile value to the volatile value to generate the total number of events. In the example shown in FIG. 11A, the determining (1110) of the nonvolatile value includes reading (1112) the number of bits written to the nonvolatile storage and decoding (1114) a nonvolatile value by multiplying the number of events written to the nonvolatile storage by the top volatile count. The volatile value used in this determination is a current value at a time of the request for the total number of events. The total number of events can then be provided to a source of the request.

FIG. 11B shows a method that may be carried out by a readout circuitry and control logic for a system in which in response to receiving the error event comprising the loss of power, the volatile counter is powered with a backup power source for a predetermined length of time during the error event, where the predetermined length of time is an amount of time sufficient to write a snapshot of the count to the nonvolatile storage. As shown in FIG. 11B, a method (1140) of determining the total number of events that have been counted at a time of a request for the count of the total number of events includes determining (1150) a nonvolatile value, reading (1120) a volatile value from the count of the volatile counter, and adding (1130) the nonvolatile value to the volatile value to generate the total number of events. The volatile value used in this determination is a current value at a time of the request for the total number of events. The total number of events is then provided to a source of the request.

In the example of FIG. 11B, the determining (1150) of the nonvolatile value includes some additional steps as compared to the determining (1110) of the nonvolatile value in example of FIG. 11A. In particular, in the example shown in FIG. 11B, the determining (1150) of the nonvolatile value includes reading (1152) a number of bits written to the nonvolatile storage, decoding (1154) an initial nonvolatile value by multiplying the number of bits written to the nonvolatile storage by the top volatile count, reading (1156) a snapshot of the count stored in the nonvolatile storage, and adding (1158) the snapshot of the count to the initial nonvolatile value to generate the nonvolatile value.

The total number of events can trigger counter-measure actions. For example, when the total number of events reaches a predetermined value, initiating a counter-measure action. In some cases, when the total number of bits written to the nonvolatile storage reaches a maximum value, a counter-measure action can be initiated.

Figure 12A:
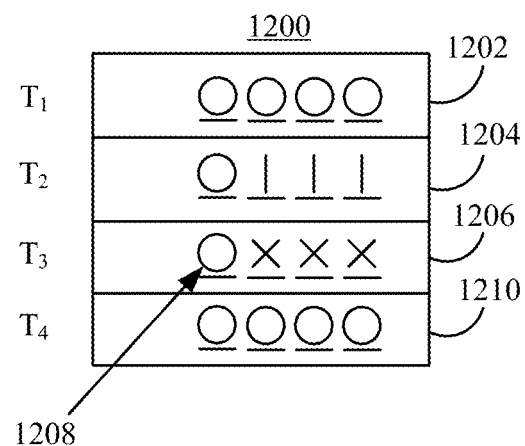
FIG. 12A represents a scenario over time where backup power is provided for a single significant bit during a loss of power event.
Figure 12B:
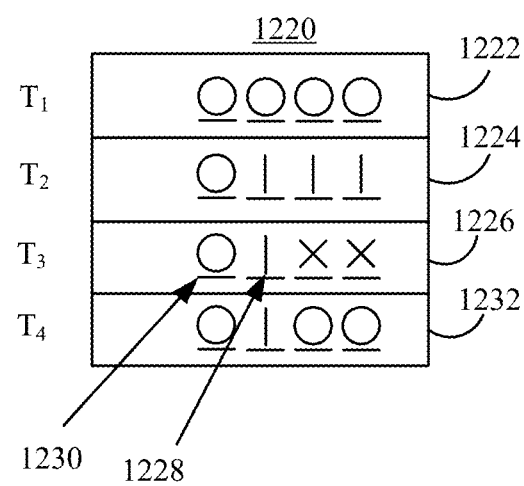
FIG. 12B represents a scenario over time where backup power is provided for two significant bits during a loss of power event.

FIGS. 12A and 12B illustrate example scenarios of a backup power supply providing power to one or more significant bits. FIG. 12A represents a scenario over time where backup power is provided for a single significant bit during a loss of power event. Referring to FIG. 12A, at a first time ($T_1$), the state 1202 of the volatile counter 1200 ("volatile counter state" 1202) is seen having counted no events. This may be the case when counting begins, such as when a volatile counter is first activated or after a top volatile count has been reached but before any more events have been counted. At a second time ($T_2$), the volatile counter state 1204 is seen having the value 0, 1, 1, 1. This may represent the count of seven events. In any case, whatever the value of the volatile counter state 1204, the value represents the number of events that have been counted in the volatile counter 1200 at the point in time.

At a third time ($T_3$), the volatile counter state 1206 is seen after having lost power. Here, the backup power is maintaining power to the most significant bit 1208. As can be seen, the most significant bit 1208 has a value of 0, however, depending on the count at the time of the error event, the most significant bit 1208 may have a value of 1. In either case, in this scenario, a backup power supply (not shown) powers only the most significant bit 1208, which will allow the most significant bit 1208 to be powered for a longer period of time by the same amount of stored charge than would be possible by powering all of the bits in the volatile counter 1200. At a fourth time ($T_4$), power has been restored to all of the bits in the volatile counter 1200 as shown by volatile counter state 1210. As can be seen, the values of the bits that did not maintain power during the loss of power event lost their values, which have returned to 0.

FIG. 12B represents a scenario over time where backup power is provided for two significant bits during a loss of power event. Referring to FIG. 12B, at a first time ($T_1$), the state 1222 of the volatile counter 1220 ("volatile counter state" 1222) is seen having counted no events. This may be the case when counting begins, such as when a volatile counter is first activated or after a top volatile count has been reached but before any more events have been counted. At a second time ($T_2$), the volatile counter 1224 is seen having the value 0, 1, 1, 1. This may represent the count of seven events. In any case, whatever the value of the volatile counter state 1224, the value represents the number of events that have been counted by the volatile counter 1220 at the point in time. At a third time ($T_3$), the volatile counter state 1226 is seen after having lost power. Here, the backup power is maintaining power to the most significant bits 1228, 1230. As can be seen, the most significant bits 1228, 1230 have values of 0 and 1, respectively. In any case, in this scenario, a backup power supply (not shown) powers only the most significant bits 1228, 1230, which will allow the most significant bit 1228, 1230 to be powered for a longer period of time by the same amount of stored charge than would be possible by powering all of the bits in the volatile counter 1220. At a fourth time ($T_4$), power has been restored to all of the bits in the volatile counter 1220 as shown by the volatile counter state 1232. As can be seen, the values of the bits that did not maintain power during the loss of power event lost their values, which have returned to 0.

It should be noted that the more bits that are considered significant (and therefore powered from a finite backup power supply), the shorter the backup power supply can supply power to the most significant bits. When fewer bits that are considered significant (and therefore fewer bits are powered from a finite backup power supply), the longer the backup power supply can supply power to the most significant bits. It should also be noted that, during a power loss event and when using a backup power supply, the voltage in the backup power supply may be monitored and, when reaching certain levels, may only supply power to the most significant bits. In other words, during a power loss event, the backup power supply may initially supply power to all of the bits in a nonvolatile counter. After the power is depleted down to a certain voltage (from supplying all of the bits in the volatile counter), the backup power supply may then supply power to only the most significant bits. In some cases, the backup power supply may supply power to multiple significant bits and, as the power is depleted down to a certain voltage (from supplying all of the most significant bits in the volatile counter), the backup power supply may then supply power to only a portion of the most significant bits. Whatever portion of the most significant bits that would continue to be supplied power from the backup power supply may be predetermined, as is understood by one of ordinary skill in the art.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A computing device comprising:
   a comparator coupled to an I/O pin of the computing device for detecting repetitive input signals;
   a storage unit coupled to the comparator for storing a representative input signal, wherein the comparator compares an input received via the I/O pin to the representative input signal stored in the storage unit to determine whether the input matches the representative input signal, and wherein the representative input signal stored in the storage unit is a prior incoming signal received via the I/O pin; and
   a counter coupled to receive an output of the comparator, wherein the counter increments upon the comparator indicating that the input matches the representative input signal indicating a repetitive input signal, wherein an output of the counter is coupled to a computation engine to provide a limit-exceeded signal to the computation engine when a value at the counter exceeds a predetermined level of acceptability for repetitive input signals, wherein the counter comprises a volatile counter and a nonvolatile storage, wherein the nonvolatile storage stores a bit for each top volatile count number of events identified by the volatile counter.

2. The computing device of claim 1, wherein the value at the counter that exceeds the predetermined level of acceptability for repetitive input signals occurs when an output of the volatile counter reaches or exceeds a threshold, wherein when the output of the volatile counter reaches or exceeds the threshold, the limit-exceeded signal is provided to the computation engine.

3. The computing device of claim 1, wherein the value at the counter that exceeds the predetermined level of acceptability for repetitive input signals occurs when a total count from the volatile counter and the nonvolatile storage reaches or exceeds a threshold, wherein when the total count from the volatile counter and the nonvolatile storage reaches or exceeds the threshold, the limit-exceeded signal is provided to the computation engine.

4. The computing device of claim 1, wherein the limit-exceeded signal is used by the computation engine to initiate a countermeasure response.

5. The computing device of claim 1, further comprising:
   a backup power source coupled to the volatile counter; and
   readout circuitry and control logic coupled to the volatile counter and to the nonvolatile storage, the readout circuitry and control logic being configured to control operations of the volatile counter during an error event and determine a total number of events.

6. The computing device of claim 1, wherein the computation engine comprises a cryptography engine.

7. The computing device of claim 1, further comprising:
   a plurality of comparators; and
   a corresponding plurality of storage units.

8. The computing device of claim 7, further comprising:
   a corresponding plurality of volatile counters coupled to the plurality of comparators.

9. The computing device of claim 8, wherein at least two volatile counters are coupled to the nonvolatile storage.

10. The computing device of claim 9, wherein the nonvolatile storage separately stores bits corresponding to each top volatile count number of events identified by the at least two volatile counters such that a total count can be performed separately.

11. The computing device of claim 8, further comprising:
    a corresponding plurality of nonvolatile storage for each volatile counter of the plurality of volatile counters.

12. The computing device of claim 1, wherein the representative input signal stored in the storage unit comprises digital bits.

13. The computing device of claim 1, wherein the representative input signal comprises plain text or cipher text of an information cycle of a smart card transaction.

* * * * *